(12) United States Patent
Sun et al.

(10) Patent No.: US 9,204,481 B2
(45) Date of Patent: Dec. 1, 2015

(54) SYSTEM AND METHOD FOR TRANSMITTING UPLINK DATA ASSOCIATED WITH DOWNLINK MULTIPLE POINT TRANSMISSION

(75) Inventors: Yishen Sun, Palatine, IL (US); Hao Bi, Lake Zurich, IL (US)

(73) Assignee: Futurewei Technologies, Inc., Plano, TX (US)

( * ) Notice: Subject to any disclaimer, the term of this patent is extended or adjusted under 35 U.S.C. 154(b) by 477 days.

(21) Appl. No.: 13/269,186

(22) Filed: Oct. 7, 2011

(65) Prior Publication Data

US 2013/0089035 A1    Apr. 11, 2013

(51) Int. Cl.
| | | |
|---|---|---|
| H04W 4/00 | (2009.01) | |
| H04W 76/02 | (2009.01) | |
| H04W 72/04 | (2009.01) | |
| H04B 7/02 | (2006.01) | |

(52) U.S. Cl.
CPC ............ *H04W 76/025* (2013.01); *H04B 7/024* (2013.01); *H04W 72/042* (2013.01)

(58) Field of Classification Search
CPC .................................................... H04W 72/04
USPC ........................................... 370/329; 709/243
See application file for complete search history.

(56) References Cited

U.S. PATENT DOCUMENTS

| | | | | |
|---|---|---|---|---|
| 2010/0067604 | A1* | 3/2010 | Bhadra et al. ................. | 375/267 |
| 2010/0142466 | A1* | 6/2010 | Palanki et al. ................. | 370/329 |
| 2010/0178923 | A1* | 7/2010 | Yi et al. ......................... | 455/436 |
| 2010/0260097 | A1* | 10/2010 | Ulupinar et al. ............... | 370/315 |
| 2011/0014922 | A1* | 1/2011 | Jen .................................. | 455/450 |
| 2011/0113299 | A1* | 5/2011 | Power et al. ................... | 714/748 |
| 2011/0124345 | A1* | 5/2011 | Lee et al. ..................... | 455/452.2 |
| 2011/0249620 | A1* | 10/2011 | Yu et al. ......................... | 370/328 |
| 2012/0020278 | A1* | 1/2012 | Moberg et al. ................ | 370/315 |
| 2012/0157081 | A1* | 6/2012 | Suzuki .......................... | 455/421 |

(Continued)

FOREIGN PATENT DOCUMENTS

| | | |
|---|---|---|
| CN | 101873671 A | 10/2010 |
| CN | 101945443 A | 1/2011 |
| CN | 102196504 A | 9/2011 |

OTHER PUBLICATIONS

"3rd Generation Partnership Project; Technical Specification Group Radio Access Network; Evolved Universal Terrestrial Radio Access (E-UTRA); Medium Access Control (MAC) Protocol Specification (Release 10)," 3GPP TS 36.321, V10.0.0, Dec. 2010, 53 pages.

(Continued)

*Primary Examiner* — Christopher R Crompton
(74) *Attorney, Agent, or Firm* — Slater & Matsil, LLP

(57) ABSTRACT

A system and method for transmitting UL data associated with DL multiple point transmission are provided. A method for transmission point operations includes determining an identifier associated with each transmission point in a downlink serving set that includes a primary transmission point and at least one secondary transmission point, transmitting downlink information to a user equipment, and receiving, at a receiving transmission point, uplink data including a first identifier of an intended recipient from the user equipment, where the intended recipient is a first transmission point in the downlink serving set. The method also includes forwarding the uplink data to the intended recipient based on the first identifier.

44 Claims, 16 Drawing Sheets

(56) References Cited

U.S. PATENT DOCUMENTS

2013/0021906 A1* 1/2013 Rahman et al. ............... 370/235
2013/0201841 A1* 8/2013 Zhang et al. .................. 370/252

OTHER PUBLICATIONS

"3$^{rd}$ Generation Partnership Project; Technical Specification Group Radio Access Network; Evolved Universal Terrestrial Radio Access (E-UTRA); Medium Access Control (MAC) protocol specification (Release 10)," 3GPP TS 36.321, V10.1.0, Mar. 2011, 53 pages.

"3$^{rd}$ Generation Partnership Project; Techincal Specification Group Radio Access Network; Evolved Universal Terrestrial Radio Access (E-UTRA); Medium Access Control (MAC) protocol specification (Release 10)," 3GPP TS 36.321, V10.2.0, Jun. 2011, 54 pages.

"3$^{rd}$ Generation Partnership Project; Technical Specification Group Radio Access Network; Evolved Universal Terrestrial Radio Access (E-UTRA); Radio Resource Control (RRC); Protocol specification (Release 10)," 3GPP TS 36.331, V10.2.0, Jun. 2011, 294 pages.

International Search Report and Written Opinion of Patent Cooperation Treaty (PCT), International Application No. PCT/CN2012/082111, Applicant Huawei Technologies Co., Ltd., et al., date of mailing Jan. 3, 2013, 11 pages.

* cited by examiner

SYSTEM AND METHOD FOR TRANSMITTING UPLINK DATA ASSOCIATED WITH DOWNLINK MULTIPLE POINT TRANSMISSION

TECHNICAL FIELD

The present invention relates generally to digital communications, and more particularly to a system and method for transmitting uplink (UL) data associated with downlink (DL) multiple point transmission.

BACKGROUND

In order to achieve better channel utilization and increase overall performance, multiple transmission and multiple reception antennas (also commonly referred to as multiple input, multiple output (MIMO)) at both enhanced Node B (eNB) (or base station (BS), Node B (NB), communications controller, and so forth) and User Equipment (UE) (or mobile station (MS), terminal, user, subscriber, subscriber equipment, and so on) are considered.

An extension to MIMO makes use of multiple transmission points (each of which may be a set of geographically co-located transmit antennas) to transmit to a single UE or a group of UEs. The transmissions from the multiple transmission points may occur at the same time, or they may occur at different times so that over a given time window the UE (or the group of UEs) will receive transmissions from all of the multiple transmission points. This operating mode may often be referred to as multiple point transmission. As an example, at a first time, a first transmission point may transmit to a UE, at a second time, a second transmission point may transmit to the UE, and so on. Here the second time may or may not be the same as the first time.

Coordinated multiple point (CoMP) transmission is one form of multiple point transmission, wherein the transmissions made by the multiple transmission points are coordinated so that the UE or the group of UEs may be able to either combine the transmissions made by the multiple transmission points or avoid interference to improve overall performance. A transmission point may be an eNB, a part of an eNB (i.e., a cell), a remote radio head (RRH) connected to an eNB, or so on. It is noted that sectors of the same site, e.g., an eNB, correspond to different transmission points. Similarly, CoMP reception involves the reception of a transmitted signal(s) at multiple geographically separated reception points.

CoMP transmission and reception is being considered for inclusion in next generation wireless communications systems, such as in Third Generation Partnership Project (3GPP) Long Term Evolution (LTE) Advanced standards compliant communications systems, as a tool to improve the coverage of high data rates, cell-edge throughput, and/or to increase overall communications system throughput in both high load and low load scenarios.

SUMMARY OF THE INVENTION

Technical advantages are generally achieved by embodiments of the present invention which provide a system and method for transmitting UL data associated with DL multiple point transmission.

In accordance with an embodiment of the present invention, a method for transmission point operations is provided. The method includes determining an identifier associated with each transmission point in a downlink serving set including a primary transmission point and at least one secondary transmission point, transmitting downlink information to a user equipment, and receiving, at a receiving transmission point, uplink data including a first identifier of an intended recipient from the user equipment, where the intended recipient is a first transmission point in the downlink serving set. The method also includes forwarding the uplink data to the intended recipient based on the first identifier.

In accordance with another embodiment of the present invention, a method of operating a user equipment is provided. The method includes receiving downlink information from each transmission point in a downlink serving set, and labeling uplink data corresponding to the downlink information with a first identifier associated with an intended recipient of the uplink data, where the intended recipient is a first transmission point in the downlink serving set. The method also includes transmitting the uplink data to a second transmission point.

In accordance with another embodiment of the present invention, a transmission point is provided. The transmission point includes a processor, a transmitter coupled to the processor, and a receiver coupled to the processor. The processor determines an identifier associated with each transmission point in a downlink serving set including a primary transmission point and at least one secondary transmission point, and forwards uplink data including a first identifier of an intended recipient to the intended recipient of the uplink data based on the first identifier, where the intended recipient is a first transmission point in the downlink serving set. The transmitter transmits downlink information to a user equipment, and the receiver receives the uplink data from the user equipment.

In accordance with another embodiment of the present invention, a user equipment is provided. The user equipment includes a receiver, a processor coupled to the receiver, and a transmitter coupled to the processor. The receiver receives downlink information from each transmission point in a downlink serving set. The processor labels uplink data corresponding to the downlink information with a first identifier associated with an intended recipient of the uplink data, where the intended recipient is a first transmission point in the downlink serving set. The transmitter transmits the uplink data to a second transmission point.

In accordance with another embodiment of the present invention, a method for transmitting a message is provided. The method includes transmitting a first field including an identifier associated with a first transmission point, where the message is used to convey identification information associated with an identified transmission point in a downlink serving set including a plurality of transmission points, and where the plurality of transmission points are participating in multiple point transmission with a user equipment.

In accordance with another embodiment of the present invention, a method for transmitting a message is provided. The method includes transmitting a first field including a first identifier associated with a first transmission point transmitting downlink information to a user equipment, where transmission points in a downlink serving set are performing multiple point transmissions with a user equipment. The method also includes transmitting a second field including a second identifier associated with a second transmission point to process uplink data corresponding to the downlink information.

One advantage of an embodiment is that UL data corresponding to DL data received from multiple transmission points are accurately provided to entities that are responsible for processing the UL data. Therefore, inconsistencies and delays in the UL data forwarding and handling may be eliminated.

A further advantage of an embodiment is that multiple bearer configurations are supported, so that the embodiment is compatible with a wide range of DL CoMP deployment scenarios.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present invention provides many applicable inventive concepts that can be embodied in a wide variety of specific contexts. The specific embodiments discussed are merely illustrative of specific structures of the invention and ways to operate the invention, and do not limit the scope of the invention.

One embodiment of the invention relates to transmitting and forwarding of UL data that corresponds to DL data received from multiple transmission points so that the UL data is accurately received by entities that are supposed to receive the UL data. For example, at a UE receiving DL data from multiple transmission points, the UE may send the UL data to a single receiving point with the UL data labeled with identification information associated with a transmission source of the DL data that corresponds to the UL data or labeled with identification information associated with a transmission source that includes an entity responsible for processing the UL data.

The present invention will be described with respect to example embodiments in a specific context, namely a 3GPP LTE-Advanced compliant communications system. The invention may also be applied, however, to other standards compliant communications systems, such as IEEE 802.16m, WiMAX, and so on, as well as non-standards compliant communications systems that support multiple point transmission.

Figure 1:
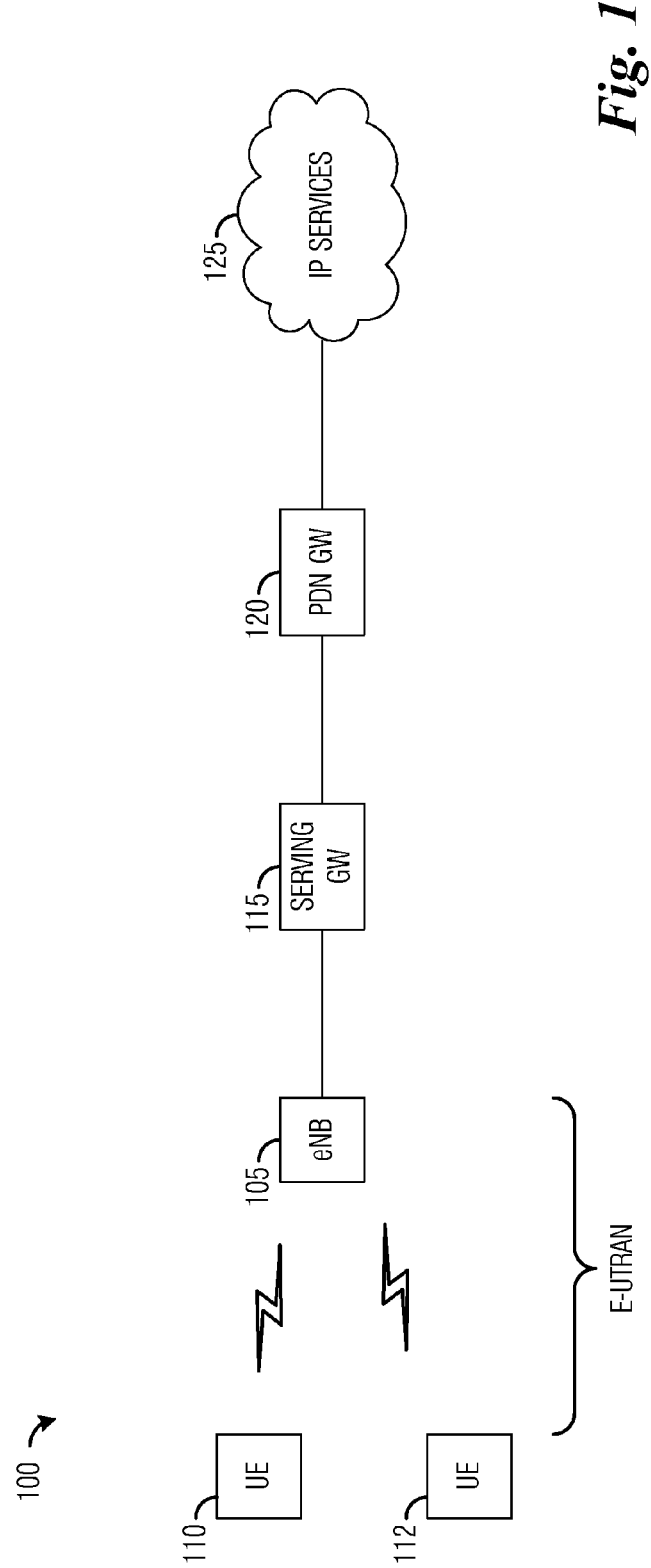
FIG. 1 illustrates an example communications system according to example embodiments described herein.

FIG. 1 illustrates a communications system 100. Communications system 100 includes an eNB 105 serving UE 110 and UE 112. eNB 105 (as well as other eNBs and their associated cells) provides an air interface for communications system 100 and is commonly referred to as an Enhanced Universal Mobile Telecommunications System (UMTS) Terrestrial Radio Access Network (E-UTRAN). A connection may be setup from a UE through eNB 105, a serving gateway (serving GW) 115, and a packet data network gateway (PDN GW) 120 to an operator's Internet Protocol (IP) services network 125.

While it is understood that communications systems may employ multiple eNBs capable of communicating with a number of UEs, only one eNB, two UEs, one serving GW, and one PDN GW are illustrated for simplicity.

Figure 2:
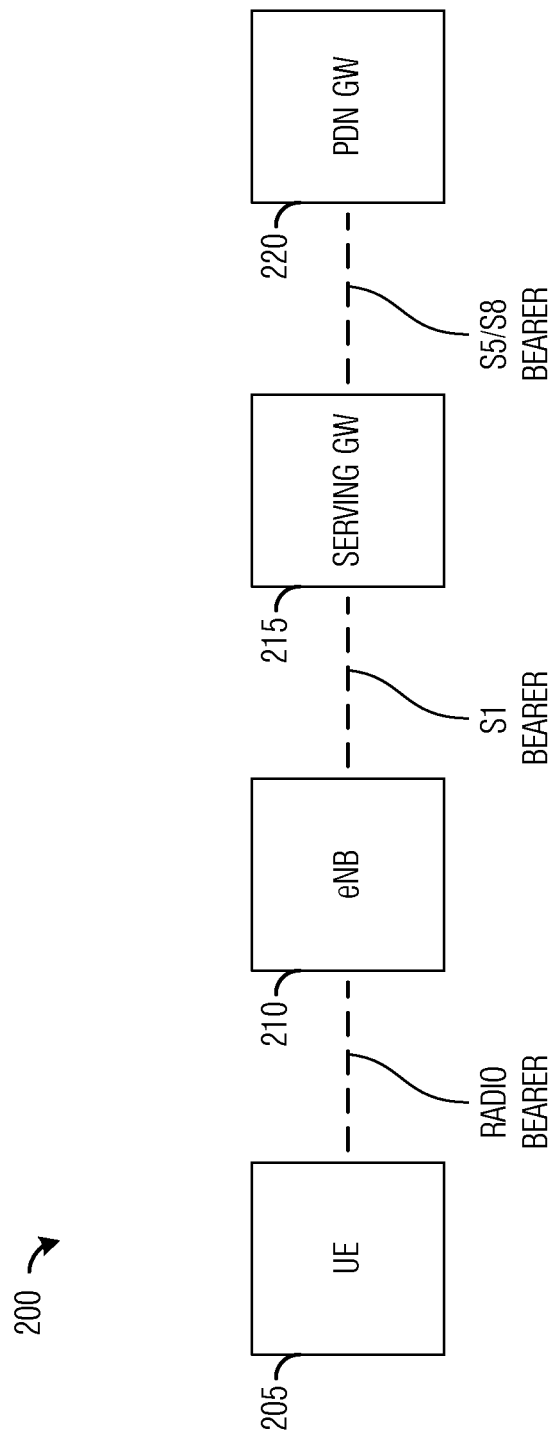
FIG. 2 illustrates an example communications system, wherein a transport of packets is highlighted according to example embodiments described herein.

FIG. 2 illustrates a communications system 200, wherein a transport of packets is highlighted. The transport of packets from PDN GW 220 to UE 205 may be organized through Evolved Packet System (EPS) bearers, which may be radio or wireline bearers. Between PDN GW 220 and serving GW 215, an S5/S8 bearer supports the transport of packets, while between serving GW 215 and eNB 210, an S1 bearer supports the transport of packets. A radio bearer supports the transport of packets between eNB 210 and UE 205. Traffic flows may be aggregated and then sent over respective bearers to their intended destination.

Figure 3:
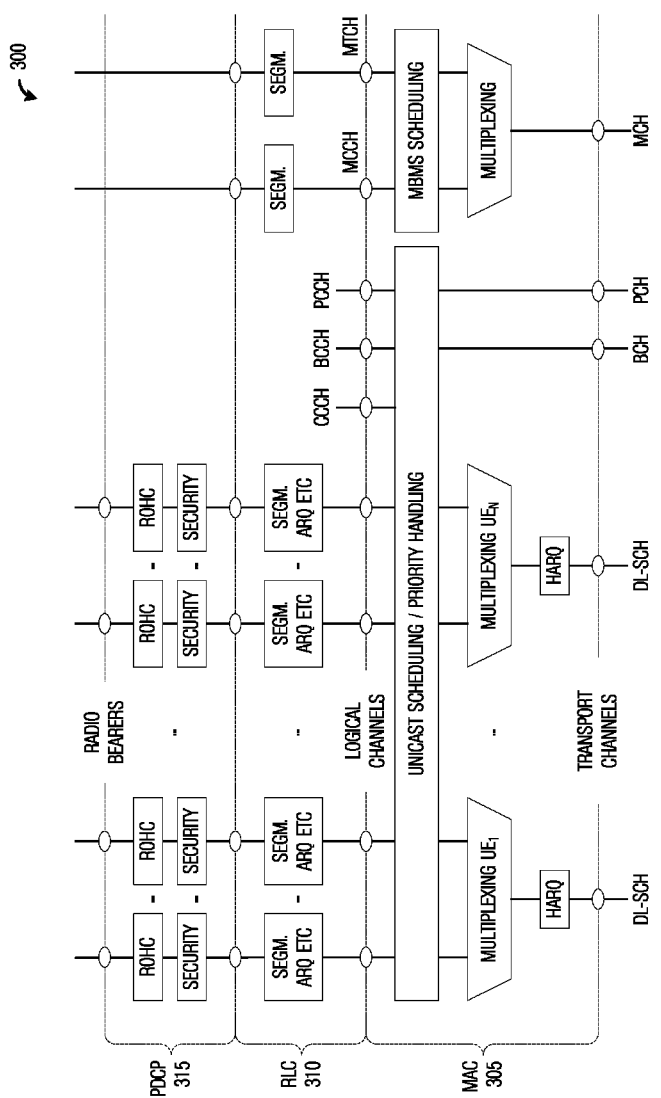
FIG. 3 illustrates an example portion of a protocol stack used in data transmission over a radio bearer according to example embodiments described herein.

FIG. 3 illustrates a portion of a protocol stack 300 used in data transmission over a radio bearer. Protocol stack 300 illustrates a medium access control (MAC) layer 305, a radio link control (RLC) layer 310, and a packet data convergence control (PDCP) layer 315. In current generation 3GPP LTE communications systems (e.g., 3GPP LTE Release-8, Release-9, and Release-10), each radio bearer of a UE is associated with one PDCP entity, and each PDCP entity is associated with one RLC entity for DL transmissions.

Figure 4:
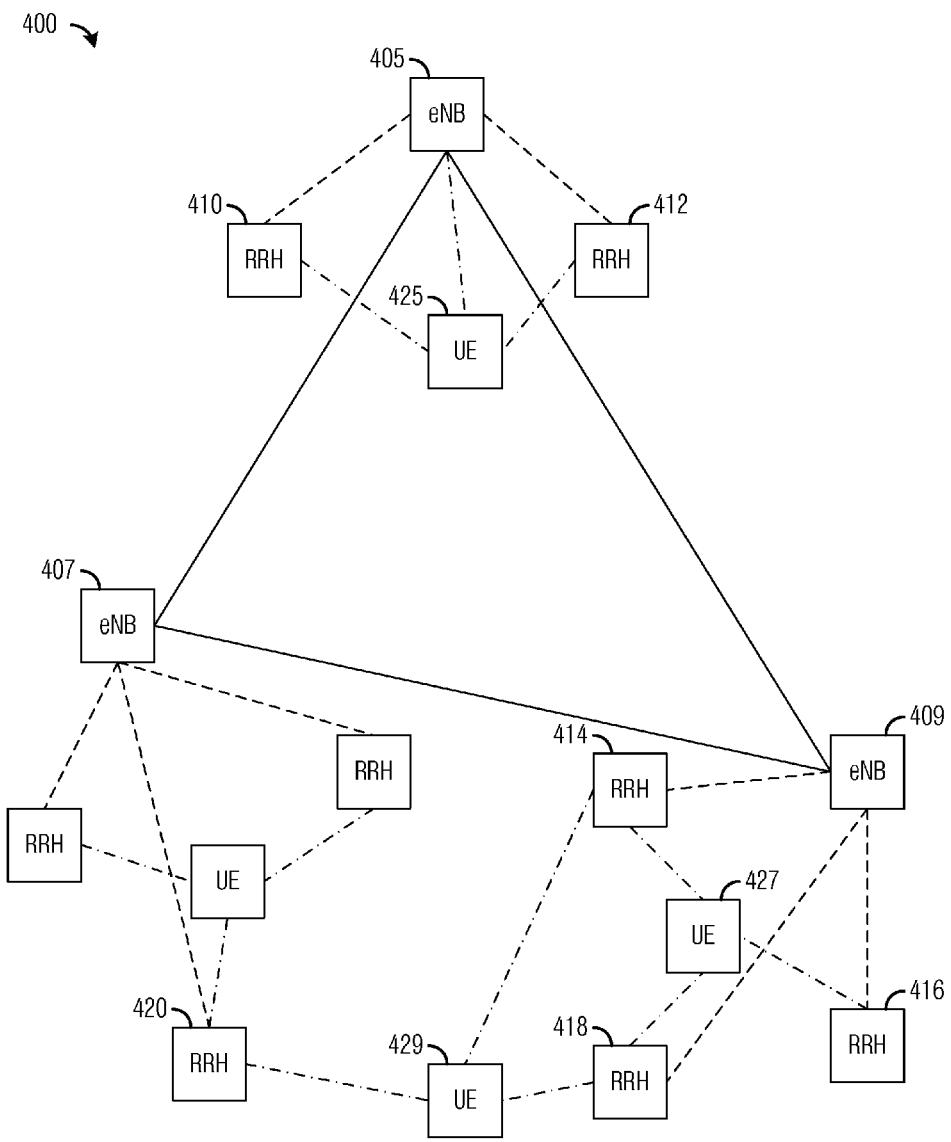
FIG. 4 illustrates an example communications system, wherein DL CoMP transmission is taking place for some of the UEs operating in a coverage area of communications system according to example embodiments described herein.

FIG. 4 illustrates a communications system 400, wherein DL multiple point transmission (e.g., CoMP transmission) is taking place for some of the UEs operating in a coverage area of communications system 400.

Although the discussion of FIG. 4 focuses on eNBs as communications controllers, other types of communications controllers may be used in place of or in conjunction with eNBs. For example, BSs, Low Power Nodes (LPN), femto cells, pico cells, and so on, may be used as replacements of or in conjunction with eNBs. Therefore, the discussion of eNBs should not be construed as being limiting to either the scope or the spirit of the example embodiments.

Furthermore, the discussion presented herein focuses on CoMP transmission. However, the example embodiments presented here are also operable with a more general form of CoMP transmission, i.e., multiple point transmission. Therefore, the discussion of CoMP transmission should not be construed as being limiting to either the scope or the spirit of the example embodiments.

Communications system 400 includes a number of eNBs, such as eNB 405, eNB 407, and eNB 409, and a number of remote radio heads (RRH), such as RRH 410, RRH 412, RRH 414, RRH 416, RRH 418, and RRH 420. Communications system 400 also includes a number of UEs, such as UE 425, UE 427, and UE 429. The UEs may be served by one or more eNBs, one or more RRHs, or a combination of eNBs and RRHs. The eNBs may allocate a portion of their bandwidth to the RRHs in order to help improve coverage, performance, and so forth.

As shown in FIG. 4, UE 425 may be served by RRH 410 and RRH 412, as well as eNB 405. While UE 427 may be served by RRH 414, RRH 416, and RRH 418. UE 429 may be served by RRHs controlled by different eNBs, such as RRH 414 and RRH 418 (controlled by eNB 409) and RRH 420 (controlled by eNB 407).

A DL serving set may be defined for DL CoMP transmission as a set of transmission points transmitting to a single UE. For example, a DL serving set for UE 425 comprises eNB 405, and RRHs 410 and 412. Similarly, a DL serving set for UE 427 comprises RRHs 414, 416, and 418.

A transmission point within a DL serving set may be referred to as a primary transmission point (or simply primary or primary point) and the remaining transmission point(s) in the DL serving set may be referred to as secondary transmission point(s) (or simply secondary, secondary point, secondaries, or secondary points). The primary transmission point may be considered to be a controlling transmission point, responsible for assigning identification information, distributing DL data to the secondary transmission points, and so forth.

Figure 5A:
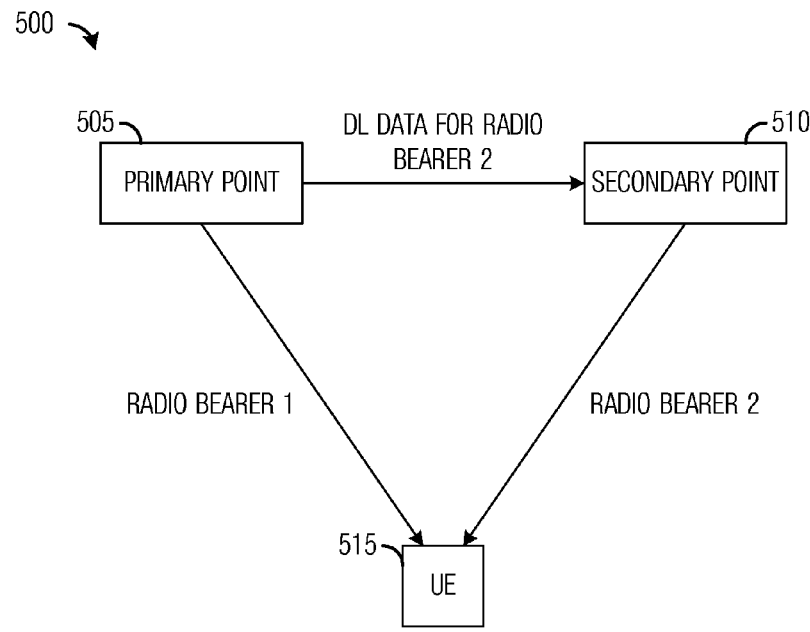
FIG. 5a illustrates an example first DL CoMP configuration according to example embodiments described herein.

FIG. 5a illustrates a first DL multiple point, e.g., CoMP, configuration 500. First DL CoMP configuration 500 includes a primary transmission point 505 and a secondary transmission point 510 transmitting DL data to a UE 515. In first DL CoMP configuration 500, a separate radio bearer is used over a wireless link between primary transmission point 505 and UE 515 (shown as radio bearer 1) and a wireless link between secondary transmission point 510 and UE 515 (shown as radio bearer 2). Since each wireless link carries a separate radio bearer, both primary transmission point 505 and secondary transmission point 510 have separate PDCP and RLC entities.

However, since primary transmission point 505 is the primary transmission point, primary transmission point 505 provides to secondary transmission point 510 DL data to transmit to UE 515 over its own radio bearer.

Figure 5B:
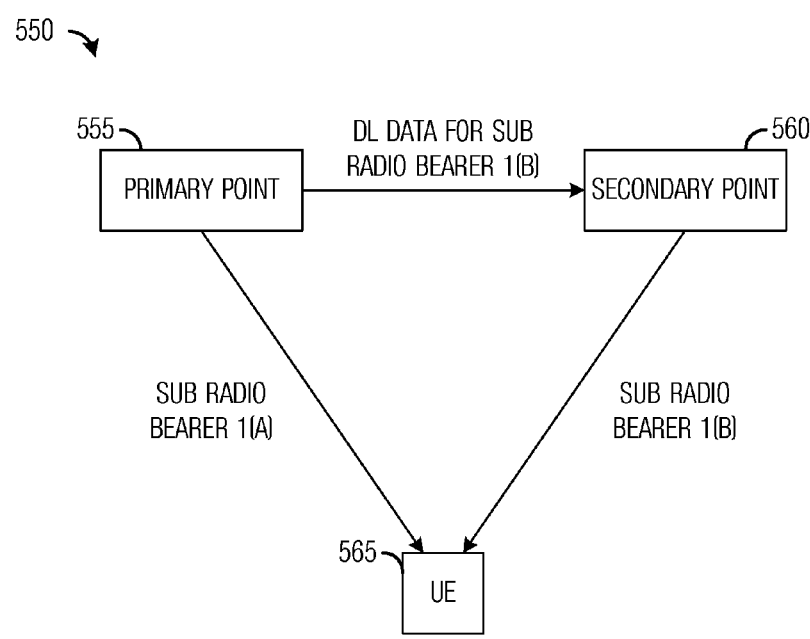
FIG. 5b illustrates an example second DL CoMP configuration according to example embodiments described herein.

FIG. 5b illustrates a second DL multiple point, e.g., CoMP, configuration 550. Second DL CoMP configuration 550 includes a primary transmission point 555 and a secondary transmission point 560 transmitting DL data to a UE 565. In second DL CoMP configuration 550, a single radio bearer is used over both a wireless link between primary transmission point 555 and UE 565 (shown as sub radio bearer 1(A)) and a wireless link between secondary transmission point 560 and UE 565 (shown as sub radio bearer 1(B)). Since both wireless links carry a single radio bearer, primary transmission point 555 has both PDCP and RLC entities, while secondary transmission point 560 has only a RLC entity.

Primary transmission point 555 provides to secondary transmission point 560 DL data to transmit to UE 565 over its portion of the single radio bearer.

Figure 5C:
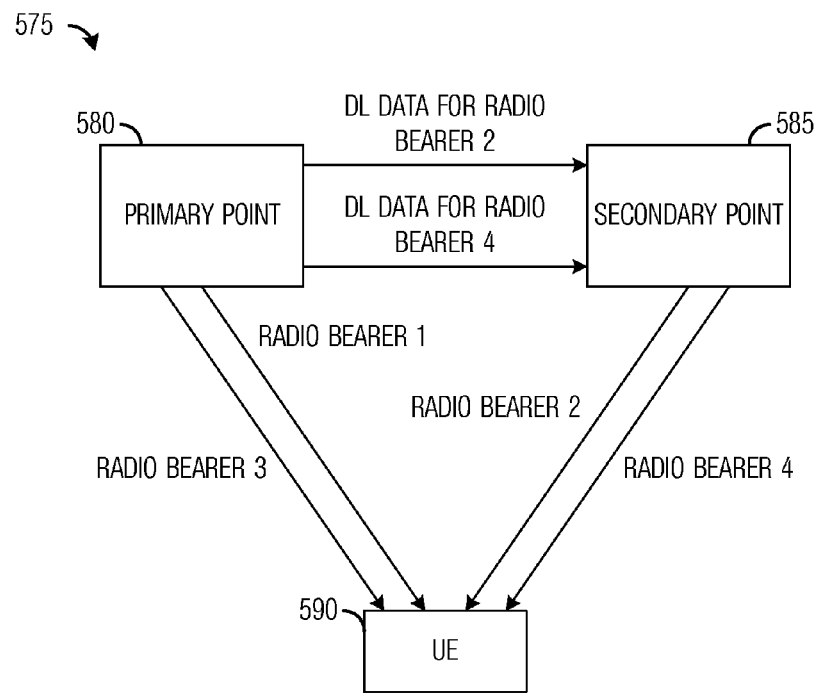
FIG. 5c illustrates an example third DL CoMP configuration according to example embodiments described herein.

FIG. 5c illustrates a third DL multiple point, e.g., CoMP, configuration 575. Third DL CoMP configuration 575 includes a primary transmission point 580 and a secondary transmission point 585 transmitting DL data to a UE 590. In third DL CoMP configuration 575, multiple radio bearers are used over each wireless link. As shown in FIG. 5c, radio bearers 1 and 3 are used over a wireless link between primary transmission point 580 and UE 590, while radio bearers 2 and 4 are used over a wireless link between secondary transmission point 585 and UE 590. Since each wireless link carriers two radio bearers, primary transmission point 580 and secondary transmission point 585 have multiple separate PDCP and RLC entities.

Although illustrated herein as having one or two radio bearers per wireless link, in general, a wireless link may have any number of radio bearers, such as one, two, three, four, and so on. Therefore, the discussion of one or two radio bearers per wireless link should not be construed as being limiting to either the scope or the spirit of the example embodiments.

Although illustrated in FIG. 5a, 5b, and FIG. 5c as having a single secondary transmission point, a DL serving set may have multiple secondary transmission points. Therefore, the illustration and discussion of DL serving sets having a single secondary transmission point should not be construed as being limiting to either the scope or the spirit of the example embodiments.

Although illustrated in FIGS. 5a, 5b, and 5c as having both primary transmission point and secondary transmission point transmitting DL data to the UE, other transmitting scenarios may exist. According to an example embodiment, not all transmission points in the DL serving set may be transmitting DL data to the UE. As an illustrative example, one of the two transmission points in a two transmission point DL serving set (e.g., either the secondary transmission point or even the primary transmission point) may be transmitting other forms of DL information, such as DL control information, to the UE, while the other transmission point may be transmitting DL data to the UE. In DL serving sets with more than two transmission points, one or more transmission points may be transmitting other forms of DL information, while the remaining transmission points may be transmitting DL data.

Although the DL serving set performs DL CoMP to a UE, there may not be a corresponding UL CoMP operation between the UE and the transmission points in the DL serving set. Therefore, there may be difficulty in getting UL data corresponding to the DL data received by the UE to the corresponding transmission points.

According to an example embodiment, the UE may transmit all UL data corresponding to the DL data to a single transmission point, referred to herein as Point A, and have the Point A forward the UL data to appropriate transmission points. The Point A may be any transmission point in the DL serving set. In order to assist the Point A in properly distributing the UL data to the appropriate transmission points, the UE may need to label the UL data with identifying information that identifies the transmission point, or a processing entity, or both.

As an illustrative example, there may be four types UL data corresponding to the DL CoMP data, and the way in which they are handled differs depending on the type.

1. MAC Control Elements—These packets may be destined for the Point A, hence no special treatment may be required;
2. RLC Control Packet Data Units (PDU)—These packets may be forwarded to a corresponding RLC entity;
3. PDCP Control PDUs—These packets may be forwarded to a corresponding PDCP entity; and
4. UL IP Packets—These packets that will be transported above the PDCP layer in a protocol stack. These packets may be forwarded to a corresponding PDCP entity for processing, such as deciphering and header decompression.

According to an example embodiment, in order to support the proper forwarding of the UL data to appropriate transmission points, a network entity (such as a primary transmission point, a secondary transmission point, a CoMP controller, and so forth) may coordinate the assignment of identifying information, e.g., logical channel identifiers (LCID), to CoMP radio bearers or sub radio bearers that are handled by the primary transmission point and the secondary transmission point(s). A requirement for the identifying information may be that the identifying information for each radio bearer or each sub radio bearer is unique.

As an illustrative example, consider a situation shown in FIG. 5a, radio bearer 1 (between primary transmission point 505 and UE 515) may be assigned a first identifying information and radio bearer 2 (between secondary transmission point 510 and UE 515) may be assigned a second identifying information, wherein the first identifying information differs from the second identifying information. Similarly, consider a situation shown in FIG. 5b, sub radio bearer 1(A) (between primary transmission point 555 and UE 565) may be assigned a third identifying information and sub radio bearer 1(B) (between secondary transmission point 560 and UE 565) may be assigned a fourth identifying information, wherein the third identifying information differs from the fourth identifying information.

After assigning the identifying information, the network entity may inform the primary transmission point of its assigned identifying information, and the network entity may inform the secondary transmission point(s) of its assigned identifying information. However, the network entity may inform the Point A (which may be the primary transmission point or a secondary transmission point) the identifying information assignments of all transmission points in the DL serving set.

According to an example embodiment, the Point A, upon receiving the UL data from the UE, may forward MAC Service Data Units (SDU) to corresponding RLC entities at secondary transmission point(s) or the primary transmission point based on the identifying information.

According to an example embodiment, in a situation wherein a single radio bearer is used by the transmission points in a DL serving set, the UE may need to send all UL IP packets and PDCP control PDUs that are associated with DL data from a secondary transmission point(s) using the identifying information assigned to the primary transmission point. Referencing FIG. 5b, all UL IP packets and PDCP control PDUs of sub radio bearer 1(B) may be transmitted over sub radio bearer 1(A) in the UL. The UE may be informed about the identifying information to use for these packets.

Figure 6A:
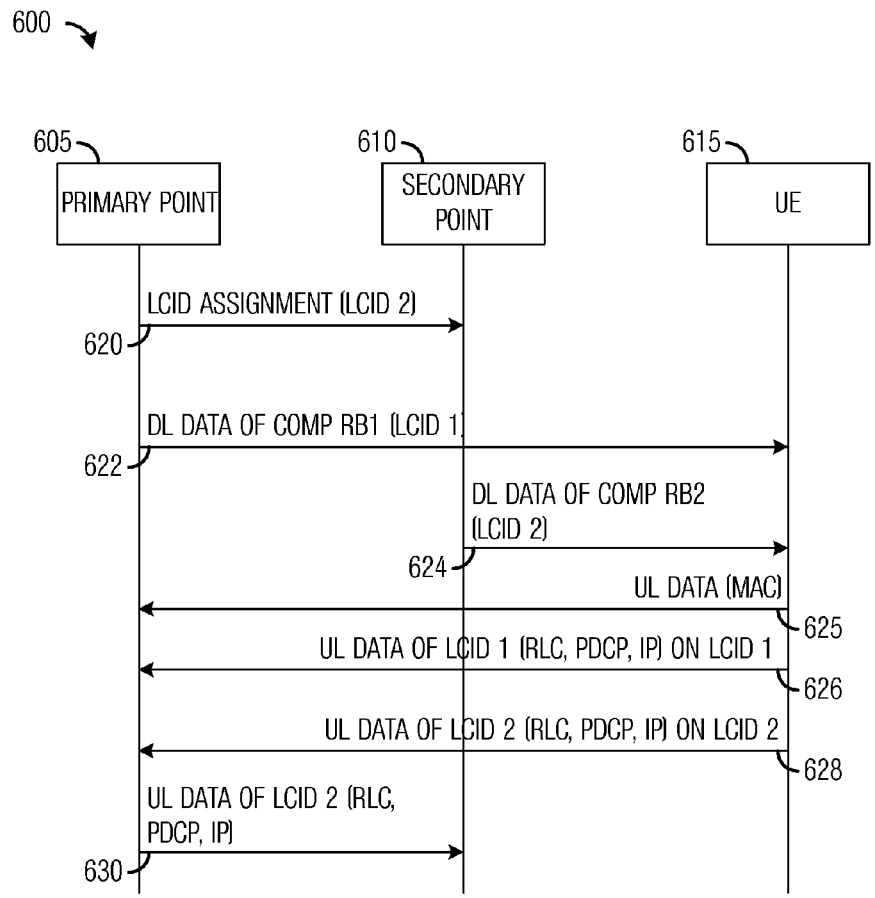
FIG. 6a illustrates an example message flow diagram for transmitting UL data corresponding to DL data from multiple transmission points to a primary transmission point, where separate radio bearers are used between each transmission point and a UE according to example embodiments described herein.

FIG. 6a illustrates a message flow diagram 600 for transmitting UL data corresponding to DL data to a primary transmission point, where separate radio bearers are used between each transmission point and a UE. Message flow diagram 600 includes messages exchanged between a primary transmission point 605, a secondary transmission point 610, and a UE 615. Although UE 615 has a DL serving set of a single secondary transmission point, the discussion presented herein may be extended to support multiple secondary transmission points by those of ordinary skill in the art of the example embodiments. Since primary transmission point 605 is receiving the UL data transmissions from UE 615, primary transmission point 605 is also the Point A.

Primary transmission point 605 may make identifying information (e.g., LCID) assignments for itself and secondary transmission point 610 and provide secondary transmission point 610 with its identifying information assignment (shown as event 620). Alternatively, a network entity, such as a CoMP controller, may make the identifying information assignments and provide the identifying information assignments to primary transmission point 605, which may provide the identifying information assignment of secondary transmission point 610 to secondary transmission point 610.

Primary transmission point 605 may transmit DL data to UE 615 over a first radio bearer (e.g., radio bearer 1) with identification information (e.g., LCID=1) (shown as event 622). Similarly, secondary transmission point 610 may transmit DL data to UE 615 over a second radio bearer (e.g., radio bearer 2) with identification information (e.g., LCID=2) (shown as event 624).

In response to the DL data from primary transmission point 605 and secondary transmission point 610, UE 615 may have UL data destined for primary transmission point 605 and secondary transmission point 610. As discussed previously, there may be four different types of UL data: MAC Control Elements, RLC Control PDUs, PDCP Control PDUs, and IP packets.

According to an example embodiment, UE 615 may send MAC Control Elements to primary transmission point 605 (i.e., the Point A). While RLC Control PDUs may be sent to a corresponding RLC entity, and PDCP Control PDUs may be sent to a corresponding PDCP entity. IP packets may be sent to a corresponding PDCP entity for processing. Hence, UE 615 may send MAC Control Elements over the wireless link between UE 615 and primary transmission point 605 (shown as event 625), wherein the MAC Control Elements may be labeled with identifying information accordingly. UE 615 may also send UL data, wherein the UL data comprises RLC Control PDUs, PDCP Control PDUs, and IP packets, corresponding to DL data from primary transmission point 605 over the wireless link between UE 615 and primary transmission point 605, wherein the UL data are labeled accordingly, e.g., with LCID=1 (shown as event 626). Furthermore, UE 615 may send RLC Control PDUs, PDCP Control PDUs, and IP packets corresponding to DL data from secondary transmission point 610 over the wireless link between UE 615 and primary transmission point 605, wherein the UL data are labeled accordingly, e.g., with LCID=2 (shown as event 628).

According to an example embodiment, each individual piece of UL data (e.g., each RLC Control PDU, PDCP Control PDU, and IP packet) may be labeled with identifying information to help ensure that each piece is forwarded to its intended destination. For example, each piece of UL data may be identified with a first identifying information that indicates a transmission point that the piece of UL data is associated with and a second identifying information that indicates an intended destination for the piece of UL data. Furthermore, the MAC Control Elements may be labeled with identifying information, which may or may not be the same as the identifying information used to label the UL data, to help ensure that the MAC Control Elements are handled accordingly and delivered to their intended destination.

According to an example embodiment, multiple pieces of UL data (e.g., each RLC Control PDU, PDCP Control PDU, and IP packet) may be grouped together into different groups based on their transmission point association and their intended destination, and each of the groups may be labeled with identifying information to help ensure that the pieces in each group are forwarded to their intended destination. For example, each group may be identified with a first identifying information that indicates a transmission point that the group of UL data is associated with and a second identifying information that indicates an intended destination for the group of UL data. Furthermore, the MAC Control Elements may be grouped together and labeled with identifying information, which may or may not be the same as the identifying information used to label the UL data, to help ensure that the MAC Control Elements are handled accordingly and delivered to their intended destination. Each group may be further divided into a manageable size for transmission purposes.

Primary transmission point 605 may forward UL data (e.g., RLC Control PDUs, PDCP Control PDUS, and IP packets) intended for secondary transmission point 610 to secondary transmission point 610 (shown as event 630). The UL data (e.g., RLC Control PDUs, PDCP Control PDUS, and IP packets) may be forwarded to secondary transmission point 610 since secondary transmission point 610 includes an RLC entity and a PDCP entity.

Figure 6B:
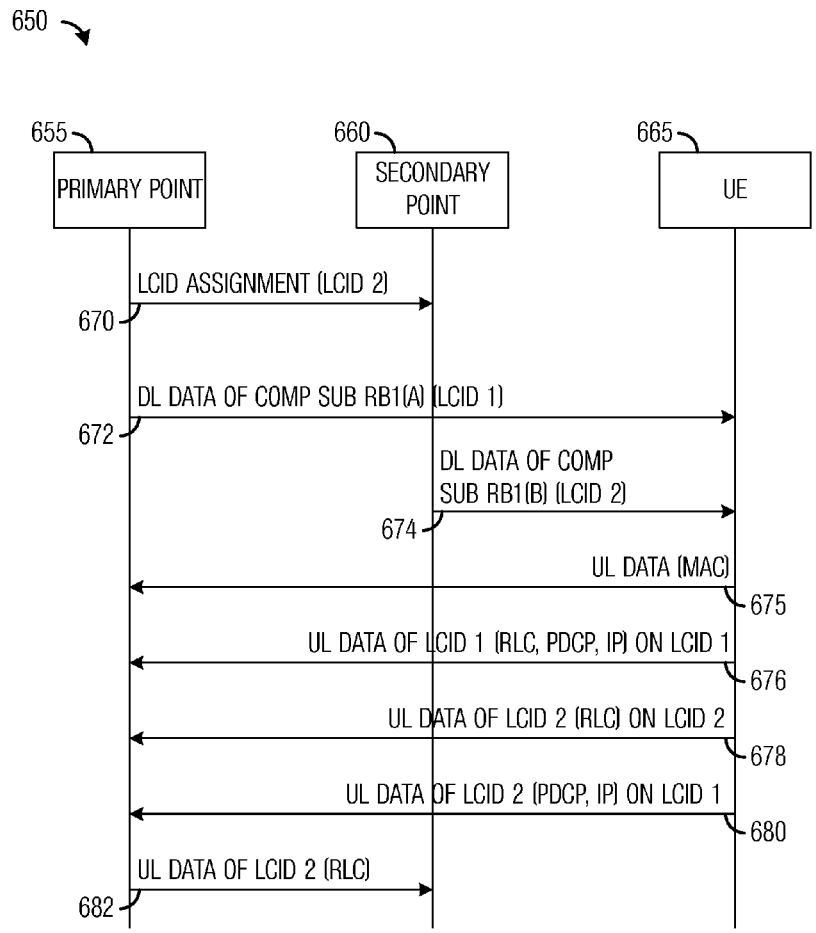
FIG. 6b illustrates an example message flow diagram for transmitting UL data corresponding to DL data from multiple transmission points to a primary transmission point, where sub radio bearers are used between each transmission point and a UE according to example embodiments described herein.

FIG. 6b illustrates a message flow diagram 650 for transmitting UL data corresponding to DL data to a primary transmission point, where sub radio bearers are used between each transmission point and a UE. Message flow diagram 650 includes messages exchanged between a primary transmission point 655, a secondary transmission point 660, and a UE 665. Although UE 665 has a DL serving set of a single secondary transmission point, the discussion presented herein may be extended to support multiple secondary transmission points by those of ordinary skill in the art of the example embodiments. Since primary transmission point 655 is receiving the UL data transmissions from UE 665, primary transmission point 655 is also the Point A.

Primary transmission point 655 may make identifying information (e.g., LCID) assignments for itself and secondary transmission point 660 and provide secondary transmission point 660 with its identifying information assignment (shown as event 670). Alternatively, a network entity, such as a CoMP controller, may make the identifying information assignments and provide the identifying information assignments to primary transmission point 655, which may provide the identifying information assignment of secondary transmission point 660 to secondary transmission point 660.

Primary transmission point 655 may transmit DL data to UE 665 over a first sub radio bearer (e.g., sub radio bearer 1(A)) with identification information (e.g., LCID=1) (shown as event 672). Similarly, secondary transmission point 660 may transmit DL data to UE 665 over a second sub radio bearer (e.g., sub radio bearer 1(B)) with identification information (e.g., LCID=2) (shown as event 674).

In response to the DL data from primary transmission point 655 and secondary transmission point 660, UE 665 may have UL data destined for primary transmission point 655 and secondary transmission point 660. As discussed previously, there may be four different types of UL data: MAC Control Elements, RLC Control PDUs, PDCP Control PDUs, and IP packets.

According to an example embodiment, UE 665 may send MAC Control Elements to primary transmission point 655 (i.e., the Point A). While RLC Control PDUs may be sent to a corresponding RLC entity, and PDCP Control PDUs may be sent to a corresponding PDCP entity. Since in a sub radio bearer configuration, a single PDCP entity is located at primary transmission point 655, PDCP Control PDUs and IP packets corresponding to DL data from secondary transmission point 660 may need to be sent to primary transmission point 655. However, secondary transmission point 660 includes a RLC entity. Therefore, RLC Control PDUs corresponding to DL data from secondary transmission point 660 may be sent to secondary transmission point 660.

Hence, UE 665 may send MAC Control Elements over the wireless link between UE 665 and primary transmission point 655 (shown as event 675), wherein the MAC Control Elements may be labeled with identifying information accordingly. UE 665 may also send RLC Control PDUs, PDCP Control PDUs, and IP packets (i.e., the UL data) corresponding to DL data from primary transmission point 655 over the wireless link between UE 665 and primary transmission point 655, wherein the UL data are labeled accordingly, e.g., with LCID=1 (shown as event 676). Furthermore, UE 665 may send RLC Control PDUs corresponding to DL data from secondary transmission point 660 over the wireless link between UE 665 and primary transmission point 655, wherein the RLC Control PDUs are labeled accordingly, e.g., with LCID=2 (shown as event 678). By labeling the RLC Control PDUs with LCID=2, UE 665 may be marking these packets for forwarding to secondary transmission point 660. Additionally, UE 665 may send PDCP Control PDUs and IP packets corresponding to DL data from secondary transmission point 660 over the wireless link between UE 665 and primary transmission point 655, wherein the PDCP Control PDUs and IP packets are labeled accordingly, e.g., with LCID=1 (shown as event 680). By labeling the PDCP Control PDUs and IP packets with LCID=1, UE 665 may be marking these packets for retention and processing by primary transmission point 655.

According to an example embodiment, each individual piece of UL data (e.g., each RLC Control PDU, PDCP Control PDU, and IP packet) may be labeled with identifying information to help ensure that each piece is forwarded to its intended destination. For example, each piece of UL data may be identified with a first identifying information that indicates a transmission point that the piece of UL data is associated with and a second identifying information that indicates an intended destination for the piece of UL data. Furthermore, the MAC Control Elements may be labeled with identifying information, which may or may not be the same as the identifying information used to label the UL data, to help ensure that the MAC Control Elements are handled accordingly and delivered to their intended destination.

According to an example embodiment, multiple pieces of UL data (e.g., each RLC Control PDU, PDCP Control PDU, and IP packet) may be grouped together into different groups based on their transmission point association and their intended destination, and each of the groups may be labeled with identifying information to help ensure that the pieces in each group are forwarded to their intended destination. For example, each group may be identified with a first identifying information that indicates a transmission point that the piece of UL data is associated with and a second identifying information that indicates an intended destination for the piece of UL data. Furthermore, the MAC Control Elements may be grouped together and labeled with identifying information, which may or may not be the same as the identifying information used to label the UL data, to help ensure that the MAC Control Elements are handled accordingly and delivered to their intended destination. Each group may be further divided into a manageable size for transmission purposes.

Primary transmission point 655 may forward a subset of UL data (e.g., RLC Control PDUs) intended for secondary transmission point 660 to secondary transmission point 660 (shown as event 682). While a subset of UL data (e.g., PDCP Control PDUs and IP packets) associated with DL data from secondary transmission point 660 may be processed by PDCP entity in primary transmission point 655.

Figure 6C:
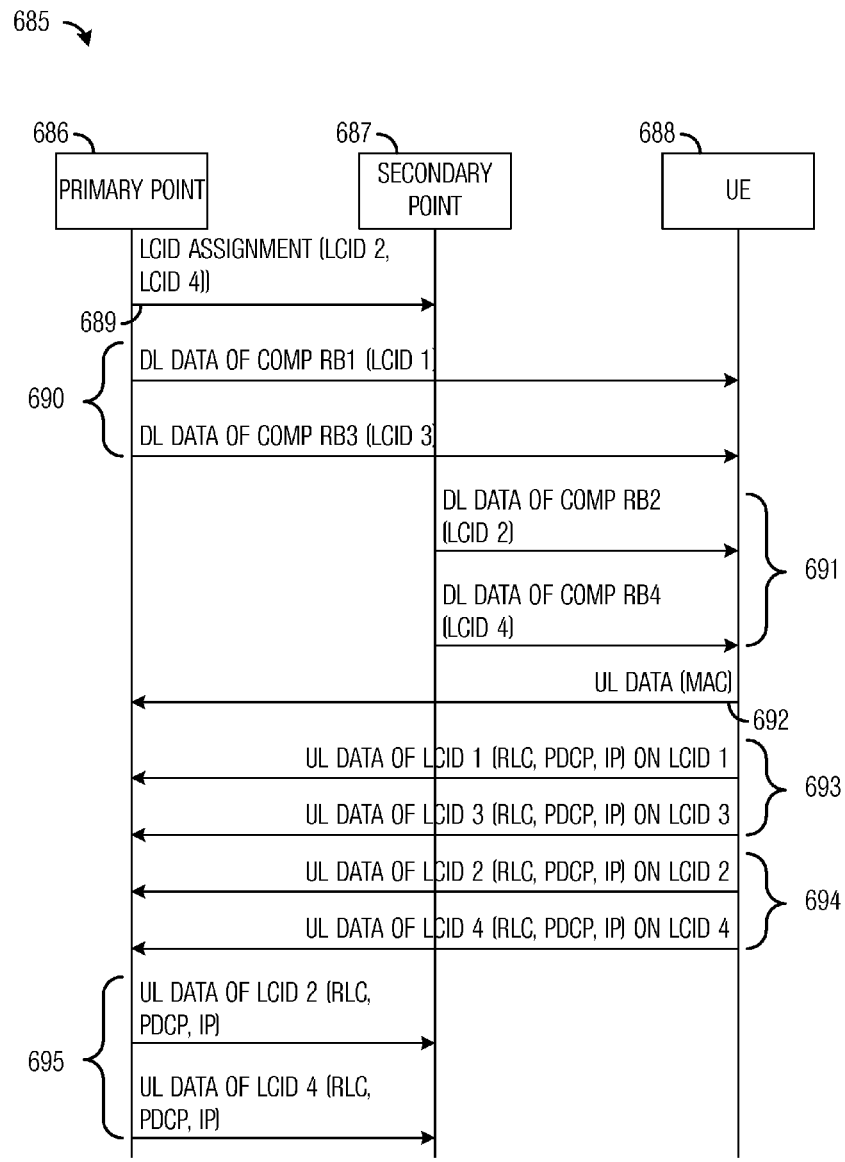
FIG. 6c illustrates an example message flow diagram for transmitting UL data corresponding to DL data from multiple transmission points to a primary transmission point, where multiple separate radio bearers are used between each transmission point and a UE according to example embodiments described herein.

FIG. 6c illustrates a message flow diagram 685 for transmitting UL data corresponding to DL data to a primary transmission point, where multiple separate radio bearers are used between each transmission point and a UE. Message flow diagram 685 includes messages exchanged between a primary transmission point 686, a secondary transmission point 687, and a UE 688. Although UE 688 has a DL serving set of a single secondary transmission point, the discussion presented herein may be extended to support multiple secondary transmission points by those of ordinary skill in the art of the example embodiments. Since primary transmission point 686 is receiving the UL data transmissions from UE 688, primary transmission point 686 is also the Point A.

Primary transmission point 686 may make identifying information (e.g., LCID) assignments for itself and secondary transmission point 687 and provide secondary transmission point 687 with its identifying information assignment (shown as event 689). As shown in FIG. 6c, primary transmission point 686 assigns identifying information assignments for the two radio bearers associated with primary transmission point 686 and the two radio bearers associated with secondary transmission point 687. Alternatively, a network entity, such as a CoMP controller, may make the identifying information assignments and provide the identifying information assignments to primary transmission point 686, which may provide the identifying information assignments of secondary transmission point 687 to secondary transmission point 687.

Primary transmission point 686 may transmit DL data to UE 688 over a first radio bearer (e.g., radio bearer 1) with identification information (e.g., LCID=1) and a third radio bearer (e.g., radio bearer 3) with identification information (e.g., LCID=3) (shown as events 690). Similarly, secondary transmission point 687 may transmit DL data to UE 688 over a second radio bearer (e.g., radio bearer 2) with identification information (e.g., LCID=2) and a fourth radio bearer (e.g., radio bearer 4) with identification information (e.g., LCID=4) (shown as events 691).

In response to the DL data from primary transmission point 686 and secondary transmission point 687, UE 688 may have UL data destined for primary transmission point 686 and secondary transmission point 687. As discussed previously, there may be four different types of UL data: MAC Control Elements, RLC Control PDUs, PDCP Control PDUs, and IP packets.

According to an example embodiment, UE 688 may send MAC Control Elements to primary transmission point 686 (i.e., the Point A). While RLC Control PDUs may be sent to a corresponding RLC entity, and PDCP Control PDUs may be sent to a corresponding PDCP entity. IP packets may be sent to a corresponding PDCP entity for processing. Hence, UE 688 may send MAC Control Elements to primary transmission point 686 (shown as event 692), wherein the MAC Control Elements may be labeled with identifying information accordingly. UE 688 may also send UL data (RLC Control PDUs, PDCP Control PDUs, and IP packets) corresponding to DL data from primary transmission point 686 over the wireless link between UE 688 and primary transmission point 686, wherein the UL data are labeled accordingly, e.g., with LCID=1 or LCID=3 (shown as events 693). Furthermore, UE 615 may send RLC Control PDUs, PDCP Control PDUs, and IP packets corresponding to DL data from secondary transmission point 687 over the wireless link between UE 688 and primary transmission point 686, wherein the UL data are labeled accordingly, e.g., with LCID=2 or LCID=4 (shown as events 694).

According to an example embodiment, each individual piece of UL data (e.g., each RLC Control PDU, PDCP Control PDU, and IP packet) may be labeled with identifying information to help ensure that each piece is forwarded to its intended destination. For example, each piece of UL data may be identified with a first identifying information that indicates a transmission point (or a radio bearer) that the piece of UL data is associated with and a second identifying information that indicates an intended destination for the piece of UL data. Furthermore, the MAC Control Elements may be labeled with identifying information, which may or may not be the same as the identifying information used to label the UL data, to help ensure that the MAC Control Elements are handled accordingly and delivered to their intended destination.

According to an example embodiment, multiple pieces of UL data (e.g., each RLC Control PDU, PDCP Control PDU, and IP packet) may be grouped together into different groups based on their transmission point association and their intended destination, and each of the groups may be labeled with identifying information to help ensure that the pieces in each group are forwarded to their intended destination. For example, each group may be identified with a first identifying information that indicates a transmission point (or a radio bearer) that the group of UL data is associated with and a second identifying information that indicates an intended destination for the group of UL data. Furthermore, the MAC Control Elements may be grouped together and labeled with identifying information, which may or may not be the same as the identifying information used to label the UL data, to help ensure that the MAC Control Elements are handled accordingly and delivered to their intended destination. Each group may be further divided into a manageable size for transmission purposes.

Primary transmission point 686 may forward UL data (e.g., RLC Control PDUs, PDCP Control PDUS, and IP packets) intended for secondary transmission point 687 to secondary transmission point 687, wherein the UL data are labeled accordingly, e.g., with LCID=2 or LCID=4 (shown as events 694). The UL data (e.g., RLC Control PDUs, PDCP Control PDUS, and IP packets) may be forwarded to secondary transmission point 687 since secondary transmission point 687 includes an RLC entity and a PDCP entity.

Figure 7A:
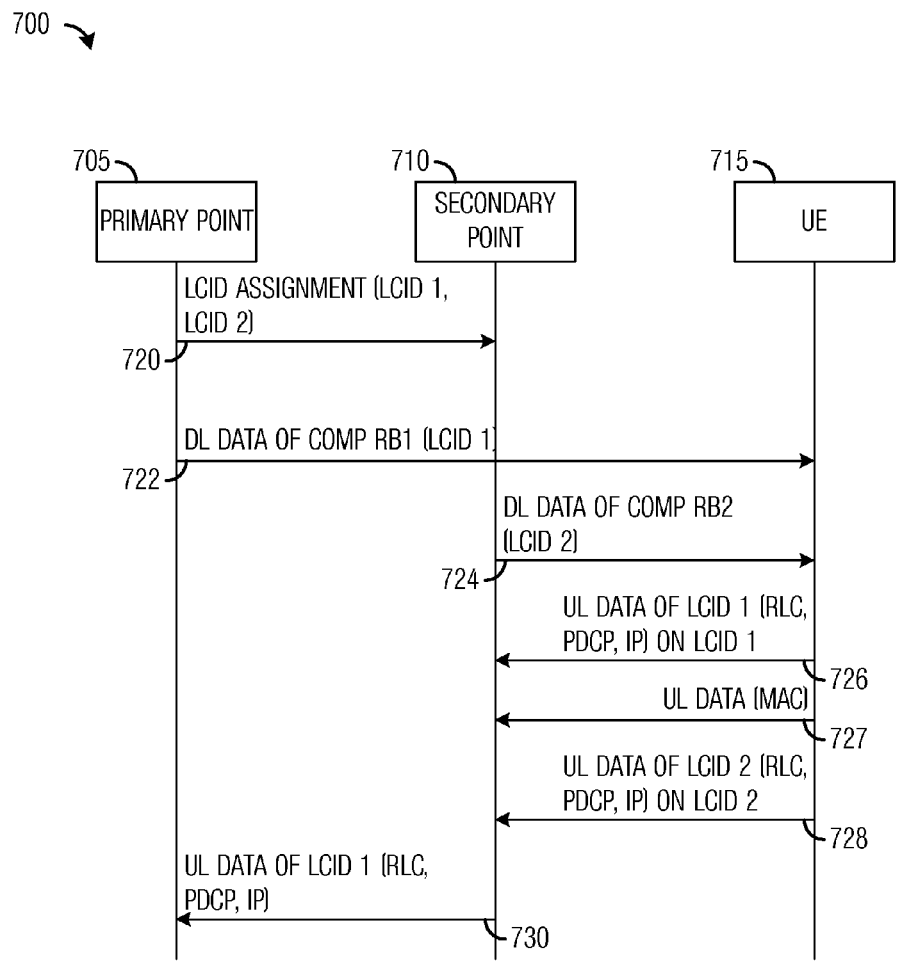
FIG. 7a illustrates an example message flow diagram for transmitting UL data corresponding to DL data from multiple transmission points to a secondary transmission point, where separate radio bearers are used between each transmission point and a UE according to example embodiments described herein.

FIG. 7*a* illustrates a message flow diagram 700 for transmitting UL data corresponding to DL data from multiple transmission points to a secondary transmission point, where separate radio bearers are used between each transmission point and a UE. Message flow diagram 700 includes messages exchanged between a primary transmission point 705, a secondary transmission point 710, and a UE 715. Although UE 715 has a DL serving set of a single secondary transmission point, the discussion presented herein may be extended to support multiple secondary transmission points by those of ordinary skill in the art of the example embodiments. Since secondary transmission point 710 is receiving the UL data transmissions from UE 715, secondary transmission point 710 is also the Point A.

Primary transmission point 705 may make identifying information (e.g., LCID) assignments for itself and secondary transmission point 710 and provide secondary transmission point 710 with its identifying information assignment (shown as event 720). Alternatively, a network entity, such as a CoMP controller may make the identifying information assignments and provide the identifying information assignments to primary transmission point 705, which may provide the identifying information assignments to secondary transmission point 710 since secondary transmission point 710 is the Point A.

Primary transmission point 705 may transmit DL data to UE 715 over a first radio bearer (e.g., radio bearer 1) with identification information (e.g., LCID=1) (shown as event 722). Similarly, secondary transmission point 710 may transmit DL data to UE 715 over a second radio bearer (e.g., radio bearer 2) with identification information (e.g., LCID=2) (shown as event 724).

In response to the DL data from primary transmission point 705 and secondary transmission point 710, UE 715 may have UL data to transmit to primary transmission point 705 and secondary transmission point 710. As discussed previously, there may be four different types of UL data: MAC Control Elements, RLC Control PDUs, PDCP Control PDUs, and IP packets.

According to an example embodiment, UE 715 may send MAC Control Elements to secondary transmission point 710 (i.e., the Point A). While RLC Control PDUs may be sent to a corresponding RLC entity, and PDCP Control PDUs may be sent to a corresponding PDCP entity. IP packets may be sent to a corresponding PDCP entity for processing. Hence, UE 715 may send RLC Control PDUs, PDCP Control PDUs, and IP packets corresponding to DL data from primary transmission point 705 over a wireless link between UE 715 and secondary transmission point 710, wherein the RLC Control PDUs, PDCP Control PDUs, and IP packets are labeled accordingly, e.g., with LCID=1 (shown as event 726). Furthermore, UE 715 may send MAC Control Elements over the wireless link between UE 715 and secondary transmission point 710 (shown as event 727), wherein the MAC Control Elements may be labeled with identifying information accordingly. UE 715 may also send RLC Control PDUs, PDCP Control PDUs, and IP packets corresponding to DL data from secondary transmission point 710 over the wireless link between UE 715 and secondary transmission point 710, wherein the RLC Control PDUs, PDCP Control PDUs, and IP packets, are labeled accordingly, e.g., with LCID=2 (shown as event 728).

According to an example embodiment, each individual piece of UL data (e.g., each RLC Control PDU, PDCP Control PDU, and IP packet) may be labeled with identifying information to help ensure that each piece is forwarded to its intended destination. For example, each piece of UL data may be identified with a first identifying information that indicates a transmission point that the piece of UL data is associated with and a second identifying information that indicates an intended destination for the piece of UL data. Furthermore, the MAC Control Elements may be labeled with identifying information, which may or may not be the same as the identifying information used to label the UL data, to help ensure that the MAC Control Elements are handled accordingly and delivered to their intended destination.

According to an example embodiment, multiple pieces of UL data (e.g., each RLC Control PDU, PDCP Control PDU, and IP packet) may be grouped together into different groups based on their transmission point association and their intended destination, and each of the groups may be labeled with identifying information to help ensure that the pieces in each group are forwarded to their intended destination. For example, each group may be identified with a first identifying information that indicates a transmission point that the piece of UL data is associated with a second identifying information that indicates an intended destination for the piece of UL data. Furthermore, the MAC Control Elements may be grouped together and labeled with identifying information, which may or may not be the same as the identifying information used to label the UL data, to help ensure that the MAC Control Elements are handled accordingly and delivered to their intended destination. Each group may be further divided into a manageable size for transmission purposes.

Secondary transmission point 710 may forward UL data (e.g. RLC Control PDUs, PDCP Control PDUS, and IP packets) intended for primary transmission point 705 to primary transmission point 705 (shown as event 730). The UL data (e.g., RLC Control PDUs, PDCP Control PDUS, and IP packets) may be forwarded to primary transmission point 705 since primary transmission point 705 includes an RLC entity and a PDCP entity.

Figure 7B:
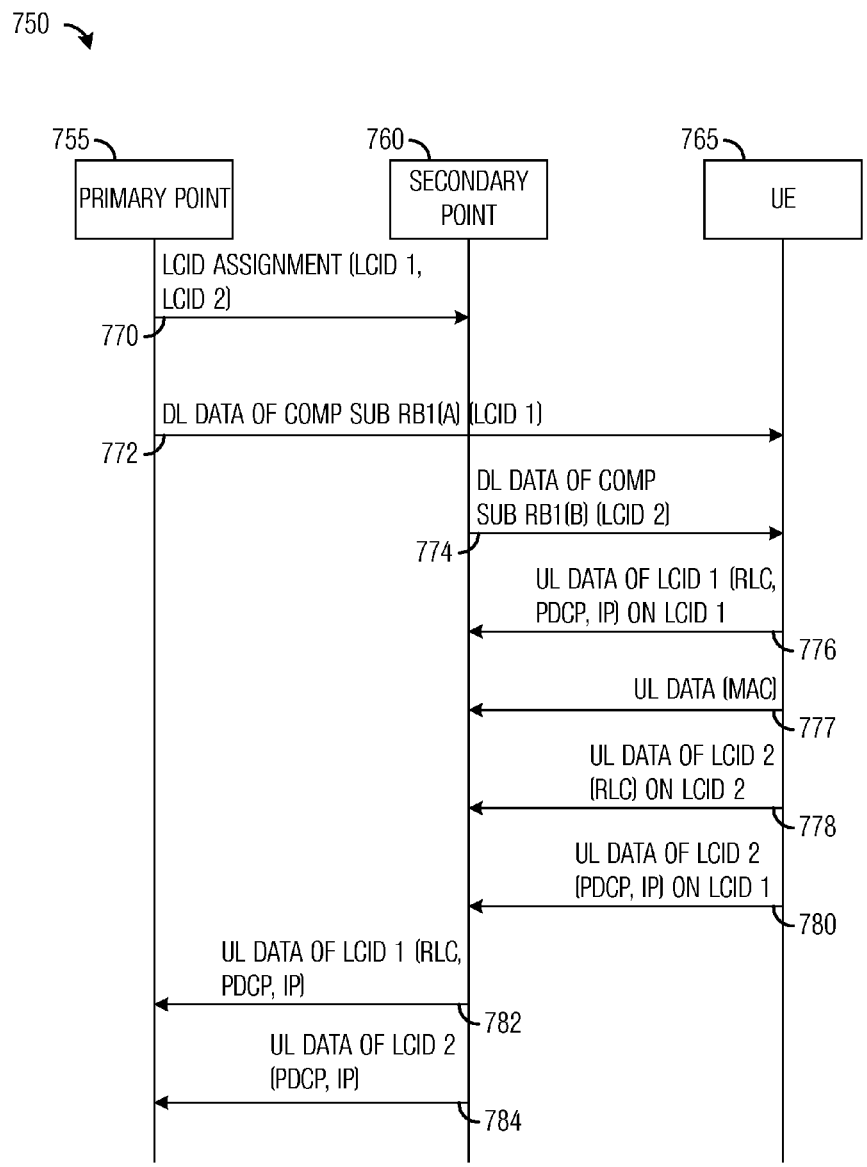
FIG. 7b illustrates an example message flow diagram for transmitting UL data corresponding to DL data from multiple transmission points to a secondary transmission point, where sub radio bearers are used between each transmission point and a UE according to example embodiments described herein.

FIG. 7*b* illustrates a message flow diagram 750 for transmitting UL data corresponding to DL data from multiple transmission points to a secondary transmission point, where sub radio bearers are used between each transmission point and a UE. Message flow diagram 750 includes messages exchanged between a primary transmission point 755, a secondary transmission point 760, and a UE 765. Although UE 765 has a DL serving set of a single secondary transmission point, the discussion presented herein may be extended to support multiple secondary transmission points by those of ordinary skill in the art of the example embodiments. Since secondary transmission point 760 is receiving the UL data transmissions from UE 765, secondary transmission point 760 is also the Point A.

Primary transmission point 755 may make identifying information (e.g., LCID) assignments for itself and secondary transmission point 760 and provide secondary transmission point 760 with the identifying information assignments (shown as event 770). Alternatively, a network entity, such as a CoMP controller may make the identifying information assignments and provide the identifying information assignments to primary transmission point 755, which may provide the identifying information assignments to secondary transmission point 760.

Primary transmission point 755 may transmit DL data to UE 765 over a first sub radio bearer (e.g., sub radio bearer 1(A)) with identification information (e.g., LCID=1) (shown as event 772). Similarly, secondary transmission point 760 may transmit DL data to UE 765 over a second sub radio bearer (e.g., sub radio bearer 1(B)) with identification information (e.g., LCID=2) (shown as event 774).

In response to the DL data from primary transmission point 755 and secondary transmission point 760, UE 765 may have UL data destined for primary transmission point 755 and secondary transmission point 760. As discussed previously, there may be four different types of UL data: MAC Control Elements, RLC Control PDUs, PDCP Control PDUs, and IP packets.

According to an example embodiment, UE 765 may send MAC Control Elements to secondary transmission point 760 (i.e., the Point A). While RLC Control PDUs may be sent to a corresponding RLC entity, and PDCP Control PDUs may be sent to a corresponding PDCP entity. Since in a sub radio bearer configuration, a single PDCP entity is located at primary transmission point 755, PDCP Control PDUs and IP packets corresponding to DL data from secondary transmission point 760 may need to be sent to primary transmission point 755. However, secondary transmission point 760 includes a RLC entity. Therefore, RLC Control PDUs corresponding to DL data from secondary transmission point 760 may be sent to secondary transmission point 760.

Hence, UE 765 may send RLC Control PDUs, PDCP Control PDUs, and IP packets corresponding to DL data from primary transmission point 755 over the wireless link between UE 765 and secondary transmission point 760, wherein the RLC Control PDUs, PDCP Control PDUs, and IP packets are labeled accordingly, e.g., with LCID=1 (shown as event 776). Furthermore, UE 765 may send MAC Control Elements over the wireless link between UE 765 and secondary transmission point 760 (shown as event 777), wherein the MAC Control Elements may be labeled with identifying information accordingly. UE 765 may also send RLC Control PDUs corresponding to DL data from secondary transmission point 760 over the wireless link between UE 765 and second transmission point 760, wherein the RLC Control PDUs, are labeled accordingly, e.g., with LCID=2 (shown as event 778). By labeling the RLC Control PDUs with LCID=2, UE 765 may be marking these packets for retention at secondary transmission point 760. Additionally, UE 765 may send PDCP Control PDUs and IP packets corresponding to DL data from secondary transmission point 660 over the wireless link between UE 765 and secondary transmission point 760, wherein the PDCP Control PDUs and IP packets are labeled accordingly, e.g., with LCID=1 (shown as event 780). By labeling the PDCP Control PDUs and IP packets with LCID=1, UE 765 may be marking these packets for forwarding to and processing by primary transmission point 755.

According to an example embodiment, each individual piece of UL data (e.g., each RLC Control PDU, PDCP Control PDU, and IP packet) may be labeled with identifying information to help ensure that each piece is forwarded to its intended destination. For example, each piece of UL data may be identified with a first identifying information that indicates a transmission point that the piece of UL data is associated with and a second identifying information that indicates an intended destination for the piece of UL data. Furthermore, the MAC Control Elements may be labeled with identifying information, which may or may not be the same as the identifying information used to label the UL data, to help ensure that the MAC Control Elements are handled accordingly and delivered to their intended destination.

According to an example embodiment, multiple pieces of UL data (e.g., each RLC Control PDU, PDCP Control PDU, and IP packet) may be grouped together into different groups based on their transmission point association and their intended destination, and each of the groups may be labeled with identifying information to help ensure that the pieces in each group are forwarded to their intended destination. For example, each group may be identified with a first identifying information that indicates a transmission point that the piece of UL data is associated with and a second identifying information that indicates an intended destination for the piece of UL data. Furthermore, the MAC Control Elements may be grouped together and labeled with identifying information, which may or may not be the same as the identifying information used to label the UL data, to help ensure that the MAC Control Elements are handled accordingly and delivered to their intended destination. Each group may be further divided into a manageable size for transmission purposes.

Secondary transmission point 760 may forward UL data (e.g., RLC Control PDUs, PDCP Control PDUs, and IP packets) intended for primary transmission point 755 to primary transmission point 755 (shown as event 782). Secondary transmission point 760 may also forward a subset of UL data (e.g., PDCP Control PDUs and IP packets) associated with DL data from secondary transmission point 760 to primary transmission point 755 for processing (shown as event 784).

Figures 8A, 8B:
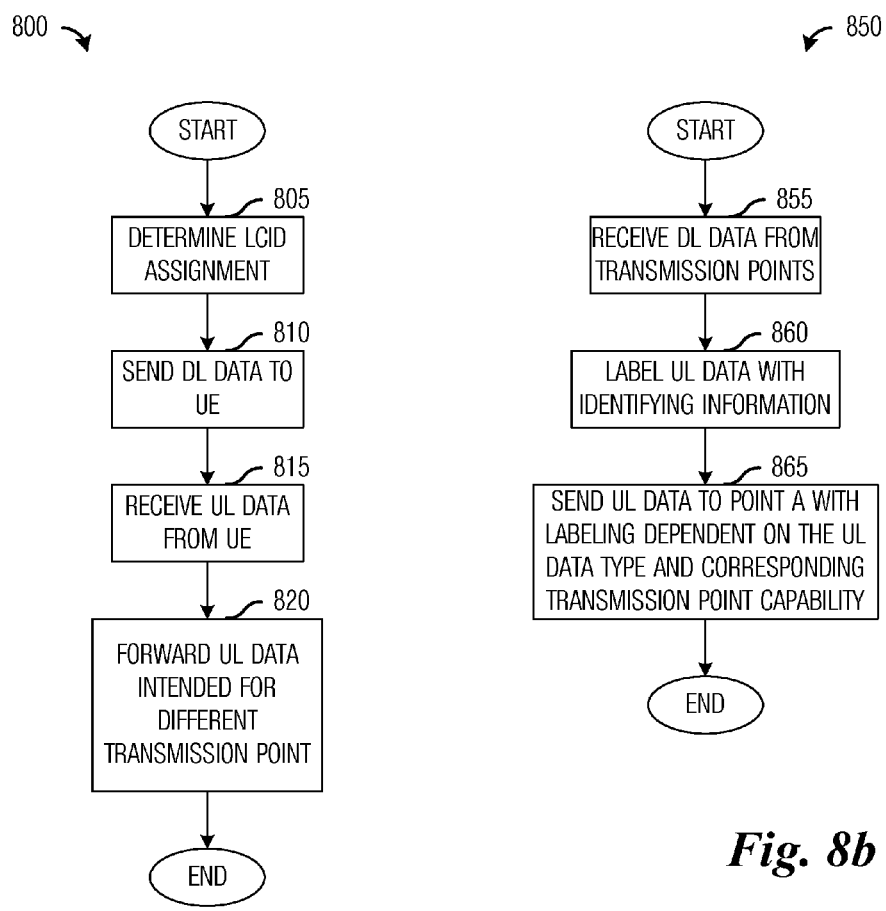
FIG. 8a illustrates an example flow diagram of Point A operations in sending DL data to a UE and receiving UL data from the UE according to example embodiments described herein.
FIG. 8b illustrates an example flow diagram of UE operations in receiving DL data and sending UL data according to example embodiments described herein.

FIG. 8a illustrates a flow diagram of Point A operations 800 in sending DL data to a UE and receiving UL data from the UE. Point A operations 800 may be indicative of operations occurring in a Point A, such as a primary transmission point or a secondary transmission point, as the Point A sends DL data to a UE and then receives UL data corresponding to the DL data from the UE, where the Point A is the sole recipient of the UL data from the UE. The Point A then forwards UL data intended for other recipients to the other recipients. Point A operations 800 may occur while the Point A is in a normal operating mode.

Point A operations 800 may begin with the Point A determining identifying information (e.g., LCID) assignment (block 805). If the Point A is the primary transmission point, then the Point A may make the identifying information assignment for itself and the secondary transmission point(s). Alternatively, another network entity may make the identifying information assignments and provide them to the Point A. Furthermore, if the Point A is the primary point, the Point A may need to provide identifying information for the secondary transmission point(s).

The Point A may send DL data to the UE (block 810). As discussed previously, a number of radio bearer configurations may be supported. A first radio bearer configuration involves a different radio bearer between the UE and each of transmission points (i.e., the primary transmission point and the secondary transmission point(s)). A second radio bearer configuration involves a single radio bearer shared between the UE and each of the transmission points.

The Point A may receive all of the UL data corresponding to the DL data sent to the UE by the transmission points (block 815). According to an example embodiment, the UL data may be identified using the identifying information. The UL data may be identified with a transmission point with which it is associated (in other words, which transmission point's DL data transmission the UL data is associated with) and a transmission point that the UE wishes to receive the UL data. The transmission point that is associated with the UL data may be different from the transmission point that is to receive the UL data. For example, if the transmission point that is associated with the UL data is incapable of processing the UL data, then the UE may select a different transmission point to receive (and subsequently process) the UL data. The UL data may be identified on an individual piece of data basis or on groups of UL data basis.

The Point A may forward the UL data to its intended recipient (block 820).

In general, UL data may comprise multiple units (such as PDUs), which may have different intended recipients depending on a source of DL data to which they correspond. The Point A may forward each unit of the UL data to its respective intended recipient depending on its identifying information.

FIG. 8b illustrates a flow diagram of UE operations 850 in receiving DL data and sending UL data. UE operations 850 may be indicative of operations occurring in a UE as the UE receives DL data from multiple transmission points and then sends UL data corresponding to the DL data to a Point A. UE operations 850 may occur while the UE is in a normal operating mode.

UE operations 850 may begin with the UE receiving DL data from multiple transmission points (block 855). As discussed previously, the UE may receive DL data from each transmission point in its DL serving set, where the DL serving set comprises a primary transmission point and one or more secondary transmission points.

The UE may respond back with UL data that corresponds to the DL data. The UL data may be labeled with identifying information (block 860). The UL data may be identified on an individual piece of data basis or on groups of UL data basis. The UL data may be sent to the Point A, which may be one of the transmission points in the DL serving set (block 865). According to an example embodiment, the UL data may be labeled with identifying information to help the Point A process the UL data as well as forward the UL data to other transmission points. The UL data may be labeled with two different identifying information, a first identifying information may identify which transmission point the UL data is associated with (in other words, the transmission point that sent the DL data that corresponds to the UL data), and a second identifying information that may identify which transmission point is to receive and/or process the UL data. As an example, if a single radio bearer is used to send the DL data, then a secondary transmission point may not be capable of processing all types of UL data. In such a situation, then the UE may need to send certain types of the UL data associated with the secondary transmission point to another transmission point, such as the primary transmission point for processing purposes.

In general, UL data may comprise multiple units (such as PDUs), which may have different intended recipients depending on a source of DL data to which they correspond. The UE may label each unit of the UL data with its corresponding intended recipient.

Figures 9A, 9B:
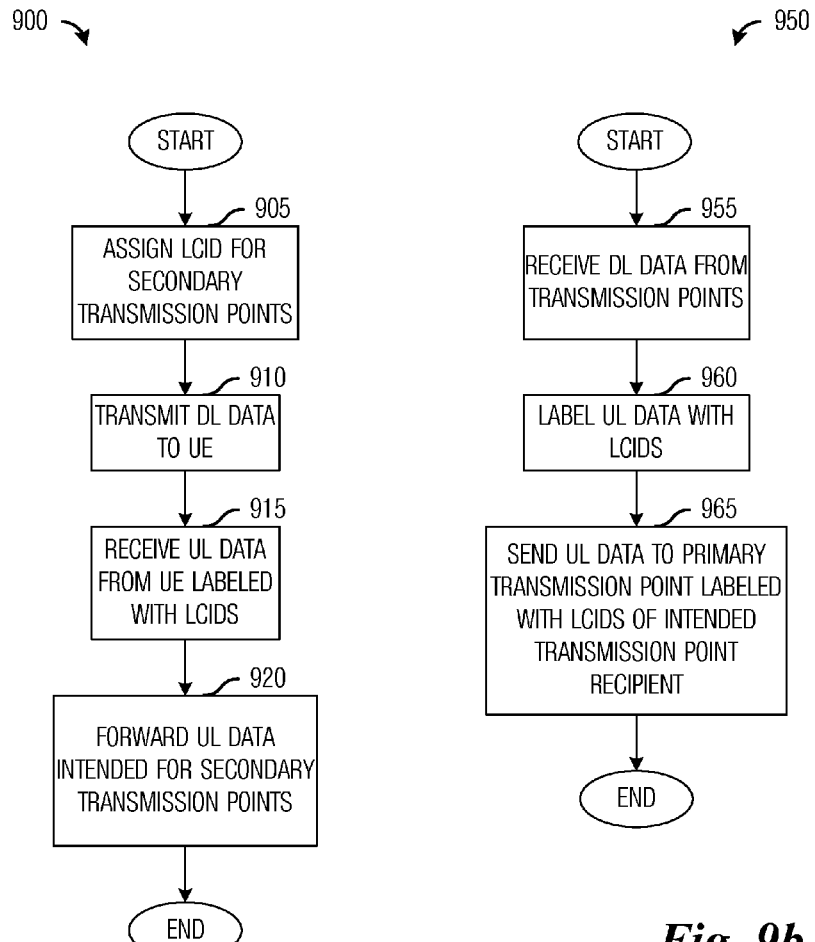
FIG. 9a illustrates an example flow diagram of primary transmission point operations in sending DL data to a UE and receiving UL data from the UE, where a primary transmission point is the Point A according to example embodiments described herein.
FIG. 9b illustrates an example flow diagram of UE operations in receiving DL data and sending UL data, where a primary transmission point is the Point A according to example embodiments described herein.

FIG. 9a illustrates a flow diagram of primary transmission point operations 900 in sending DL data to a UE and receiving UL data from the UE, where a primary transmission point is the Point A. Primary transmission point operations 900 may be indicative of operations occurring in a primary transmission point as the primary transmission point sends DL data to a UE and then receives UL data corresponding to the DL data from the UE, where the primary transmission point is the sole recipient of the UL data from the UE. The primary transmission point then forwards UL data intended for other transmission points to the other transmission points. Primary transmission point operations 900 may occur while the primary transmission point is in a normal operating mode.

Primary transmission point operations 900 may begin with the primary transmission point assigning identifying information (e.g., LCID) to secondary transmission point(s) and providing the identifying information assignments to the secondary transmission point(s) (block 905).

The primary transmission point may transmit DL data to the UE (block 910). The primary transmission point may receive UL data corresponding to the DL data from the UE (block 915). The UL data may be labeled with identifying information to help the primary transmission point determine where to forward or how to process the UL data. As discussed previously, the UL data may be labeled with information regarding which transmission point the UL data is associated with and information regarding a transmission point that is the intended recipient of the UL data. The UL data may be identified on an individual piece of data basis or on groups of UL data basis. The primary transmission point may forward the UL data to its intended recipient(s) (block 920).

FIG. 9b illustrates a flow diagram of UE operations 950 in receiving DL data and sending UL data, where a primary transmission point is the Point A. UE operations 950 may be indicative of operations occurring in a UE as the UE receives DL data from multiple transmission points and then sends UL data corresponding to the DL data to the primary transmission point. UE operations 950 may occur while the UE is in a normal operating mode.

UE operations 950 may begin with the UE receiving DL data from multiple transmission points (block 955). As discussed previously, the UE may receive DL data from each transmission point in its DL serving set, where the DL serving set comprises a primary transmission point and one or more secondary transmission points.

The UE may respond back with UL data that corresponds to the DL data. The UE may label the UL data with identifying information, e.g., LCIDs (block 960). The UL data may be identified on an individual piece of data basis or on groups of UL data basis. The UL data may be sent to the primary transmission point (block 965). According to an example embodiment, the UL data may be labeled with identifying information to help the primary transmission point process the UL data as well as forward the UL data to other transmission points. The UL data may be labeled with two different identifying information, a first identifying information may identify which transmission point the UL data is associated with (in other words, the transmission point that sent the DL data that corresponds to the UL data), and a second identifying information that may identify which transmission point is to receive and/or process the UL data.

Figures 10A, 10B:
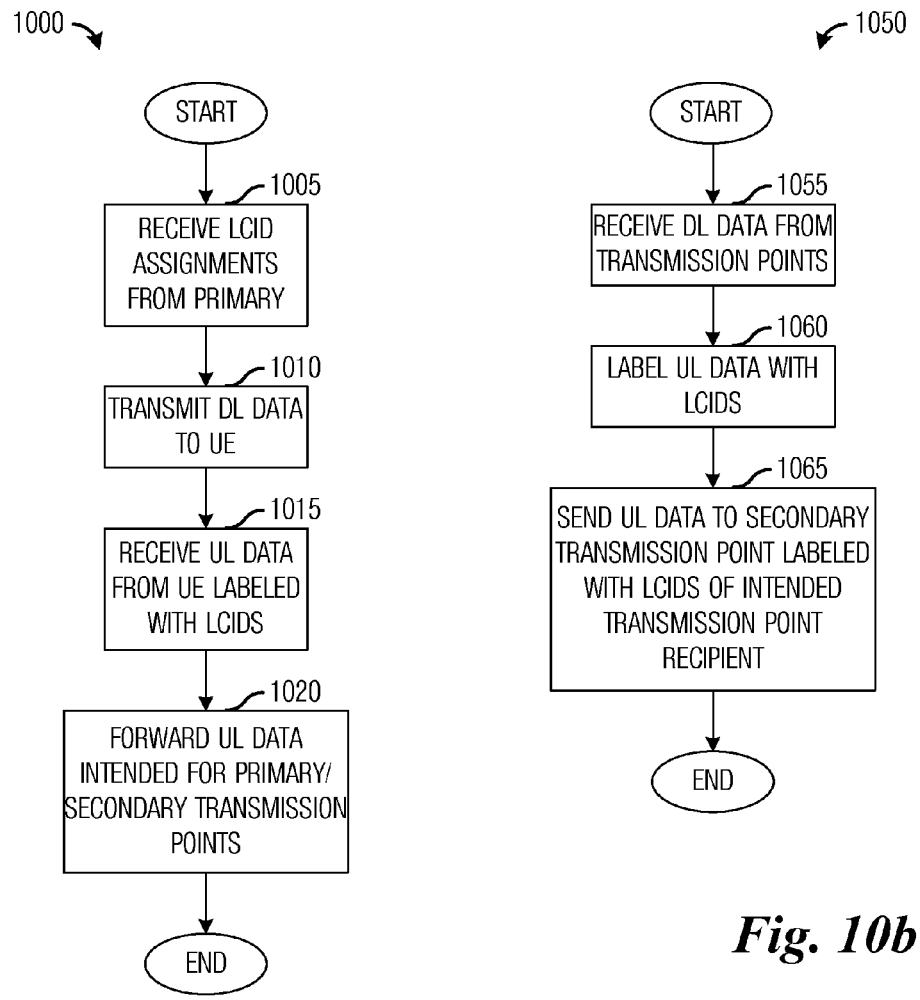
FIG. 10a illustrates an example flow diagram of secondary transmission point operations in sending DL data to a UE and receiving UL data from the UE, where a secondary transmission point is the Point A according to example embodiments described herein.
FIG. 10b illustrates an example flow diagram of UE operations in receiving DL data and sending UL data, where a secondary transmission point is the Point A according to example embodiments described herein.

FIG. 10a illustrates a flow diagram of secondary transmission point operations 1000 in sending DL data to a UE and receiving UL data from the UE, where a secondary transmission point is the Point A. Secondary transmission point operations 1000 may be indicative of operations occurring in a secondary transmission point as the secondary transmission point sends DL data to a UE and then receives UL data corresponding to the DL data from the UE, where the secondary transmission point is the sole recipient of the UL data from the UE. The secondary transmission point then forwards UL data intended for other transmission points to the other transmission points. Secondary transmission point operations 1000 may occur while the secondary transmission point is in a normal operating mode.

Secondary transmission point operations 1000 may begin with the secondary transmission point receiving identifying information assignments (e.g., LCID) from a primary transmission point (block 1005).

The secondary transmission point may transmit DL data to the UE (block 1010). The secondary transmission point may receive UL data corresponding to the DL data from the UE (block 1015). The UL data may be labeled with identifying information to help the secondary transmission point determine where to forward or how to process the UL data. As discussed previously, the UL data may be labeled with information regarding which transmission point the UL data is associated with and information regarding a transmission point that is the intended recipient of the UL data. The UL data may be identified on an individual piece of data basis or on groups of UL data basis. The secondary transmission point may forward the UL data to its intended recipient(s) (block 1020).

FIG. 10b illustrates a flow diagram of UE operations 1050 in receiving DL data and sending UL data, where a secondary transmission point is the Point A. UE operations 1050 may be indicative of operations occurring in a UE as the UE receives DL data from multiple transmission points and then sends UL data corresponding to the DL data to the secondary transmission point. UE operations 1050 may occur while the UE is in a normal operating mode.

UE operations 1050 may begin with the UE receiving DL data from multiple transmission points (block 1055). As discussed previously, the UE may receive DL data from each transmission point in its DL serving set, where the DL serving set comprises a primary transmission point and one or more secondary transmission points.

The UE may respond back with UL data that corresponds to the DL data. The UE may label the UL data with identifying information, e.g., LCIDs (block 1060). The UL data may be identified on an individual piece of data basis or on groups of UL data basis. The UL data may be sent to the secondary transmission point (block 1065). According to an example embodiment, the UL data may be labeled with identifying information to help the secondary transmission point process the UL data as well as forward the UL data to other transmission points. The UL data may be labeled with two different identifying information, a first identifying information may identify which transmission point the UL data is associated with (in other words, the transmission point that sent the DL data that corresponds to the UL data), and a second identifying information that may identify which transmission point is to receive and/or process the UL data.

Figure 11:
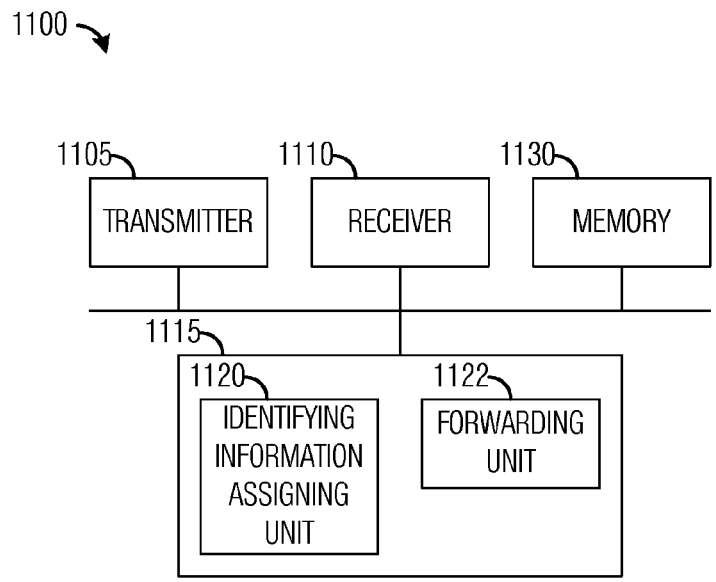
FIG. 11 illustrates an example communications controller according to example embodiments described herein.

FIG. 11 provides an illustration of a communications controller 1100. Communications controller 1100 may be an implementation of an eNB, a BS, a RRH, or so on. Communications controller 1100 may be used to implement various ones of the embodiments discussed herein. As shown in FIG. 11, a transmitter 1105 is configured to send packets and a receiver 1110 is configured to receive packets. Transmitter 1105 and receiver 1110 may have a wireless interface, a wireline interface, or a combination thereof.

An identifying information assigning unit 1120 is configured to assign identifying information, such as a LCID, to transmission points of a DL serving set, which comprises a primary transmission point and one or more secondary transmission points. A forwarding unit 1122 is configured to forward UL data received from UE to intended transmission points as identified by identifying information used to label the UL data. A memory 1130 is configured to store identifying information, DL data, UL data, and so on.

The elements of communications controller 1100 may be implemented as specific hardware logic blocks. In an alternative, the elements of communications controller 1100 may be implemented as software executing in a processor, controller, application specific integrated circuit, or so on. In yet another alternative, the elements of communications controller 1100 may be implemented as a combination of software and/or hardware.

As an example, transmitter 1105 and receiver 1110 may be implemented as a specific hardware block, while identifying information assigning unit 1120 and forwarding unit 1122 may be software modules executing in a processor 1115, a microprocessor, a custom circuit, or a custom compiled logic array of a field programmable logic array.

Figure 12:
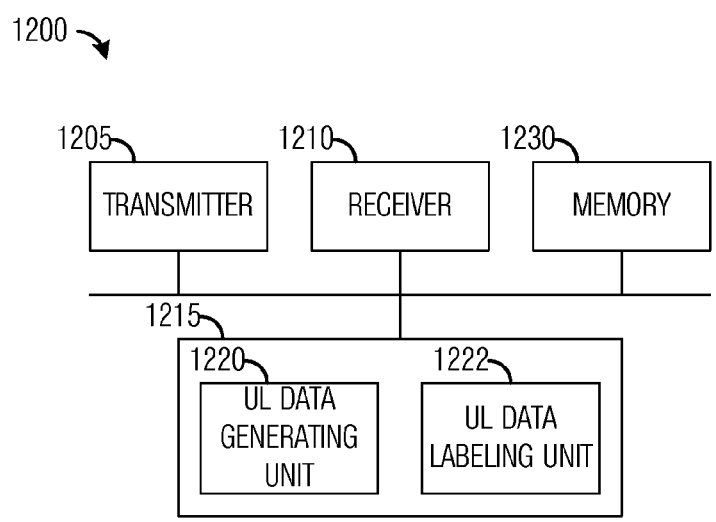
FIG. 12 illustrates an example UE according to example embodiments described herein.

FIG. 12 provides an illustration of a UE 1200. UE 1200 may be an implementation of a user equipment, a mobile station, a user, a subscriber, a terminal, or so on. UE 1200 may be used to implement various ones of the embodiments discussed herein. As shown in FIG. 12, a transmitter 1205 is configured to send packets and a receiver 1210 is configured to receive packets. Transmitter 1205 and receiver 1210 may have a wireless interface, a wireline interface, or a combination thereof.

A UL data generating unit 1220 is configured to generate UL data based on DL data received by UE 1200. A UL data labeling unit 1222 is configured to assign identifying information, such as a LCID, to UL data to be transmitted to a Point A. As discussed previously, the UL data may be labeled with a first identifying information that identifies a transmission point associated with the UL data and a second identifying information that identifies an intended recipient of the UL data. A memory 1230 is configured to store identifying information, DL data, UL data, and so on.

The elements of UE 1200 may be implemented as specific hardware logic blocks. In an alternative, the elements of UE 1200 may be implemented as software executing in a processor, controller, application specific integrated circuit, or so on. In yet another alternative, the elements of UE 1200 may be implemented as a combination of software and/or hardware.

As an example, transmitter 1205 and receiver 1210 may be implemented as a specific hardware block, while UL data generating unit 1220 and UL data labeling unit 1222 may be software modules executing in a processor 1215, a microprocessor, a custom circuit, or a custom compiled logic array of a field programmable logic array.

Figure 13A:
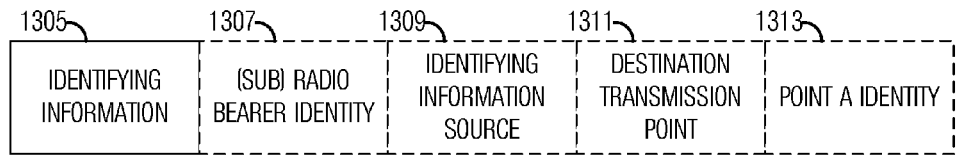
FIG. 13a illustrates an example first message according to example embodiments described herein.

FIG. 13a illustrates a first message 1300. First message 1300 may be sent by a network entity, such as a stand-alone network entity, a CoMP controller, a primary transmission point, or a secondary transmission point, to provide identifying information associated with a radio bearer or sub radio bearer to a transmission point. Alternatively, first message 1300 may be embedded in another message.

First message 1300 includes identifying information associated with the radio bearer, or the sub radio bearer to the transmission point, e.g., LCID(s) (shown as "IDENTIFYING INFORMATION" field 1305). It is noted that there may be a separate IDENTIFYING INFORMATION field for each identifying information, e.g., LCID, associated with the radio bearer or the sub radio bearer. First message 1300 optionally includes a field containing corresponding radio bearer(s) or sub radio bearer(s) identification information (shown as "(SUB) RADIO BEARER IDENTITY" field 1307).

First message 1300 also optionally includes an identifying information field (shown as "identifying information source" field 1309) for a source of the message, i.e., the network entity, the primary transmission point, or the secondary transmission point sending first message 1300; an identifying information field (shown as "destination transmission point" field 1311) for a destination of first message 1300, i.e., the transmission point which receives first message 1300; and an identifying information field (shown as "Point A identity" field 1311) for a Point A, i.e., a single transmission point to receive UL data transmissions from UE, as described previously.

Figure 13B:
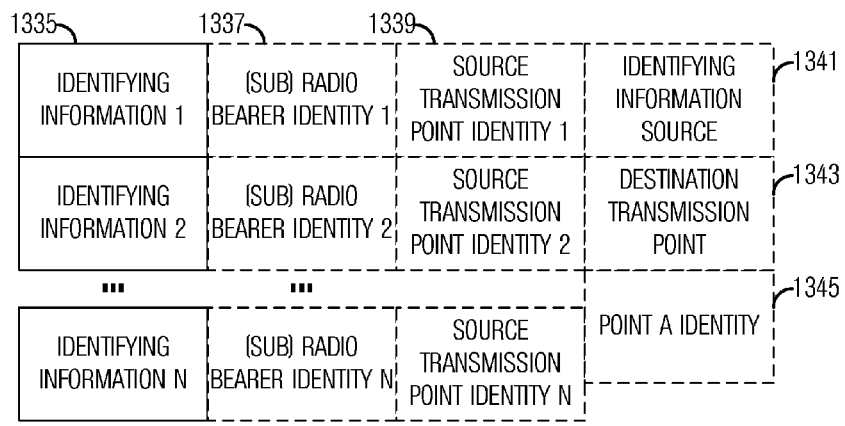
FIG. 13b illustrates an example second message according to example embodiments described herein.

FIG. 13b illustrates a second message 1330. Second message 1330 may be sent by a network entity, such as a stand-alone network entity, a CoMP controller, a primary transmission point, or a secondary transmission point, to provide individual identifying information, e.g., LCID, to be used by each transmission point for identifying radio bearers or sub radio bearers to a transmission point. Alternatively, second message 1330 may be embedded in another message or split into multiple messages.

Second message 1330 may include up to N identifying information, e.g., LCID fields associated with transmission points of up to N radio bearers or sub radio bearers (shown as "IDENTIFYING INFORMATION 1" field through "IDENTIFYING INFORMATION N" field 1335), where N is a positive integer value. There may optionally be up to N fields containing corresponding radio bearer(s) or sub radio bearer(s) identification information (shown as "(SUB) RADIO BEARER IDENTITY 1" through "(SUB) RADIO BEARER IDENTITY N" field 1337); and up to N fields containing identifying information for a source transmission point using the corresponding radio bearer or sub radio bearer to transmit DL data to a UE (shown as "SOURCE TRANSMISSION POINT IDENTITY 1" through "SOURCE TRANSMISSION POINT IDENTITY N" fields 1339).

Second message 1330 also optionally includes an identifying information field (shown as "identifying information source" field 1341) for a source of the message, i.e., the network entity, the primary transmission point, or the secondary transmission point sending second message 1330; an identifying information field (shown as "destination transmission point" field 1343) for a destination of the message, i.e., the transmission point which receives second message 1330; and an identifying information field (shown as "Point A identity" field 1345) for a Point A, i.e., a single transmission point to receive UL data transmissions from UE, as described previously.

Figure 13C:
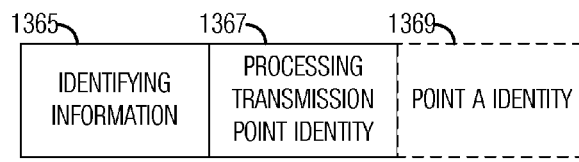
FIG. 13c illustrates an example third message according to example embodiments described herein.

FIG. 13c illustrates a third message 1360. Third message 1360 may be sent by a network entity, such as a stand-alone network entity, a CoMP controller, a primary transmission point, or a secondary transmission point, to a UE to inform the UE of the identifying information, e.g., LCID, that the UE should use for transmitting all UL IP packets and PDCP Control PDUs that are associated with the DL data received from any transmission point. Alternatively, third message 1360 may be embedded in another message.

Third message 1360 may include identifying information, e.g., LCID, associated with a transmission point of a radio bearer or a sub radio bearer carrying the DL data (shown as "IDENTIFYING INFORMATION" field 1365), and identifying information, e.g., LCID, of a transmission point that is to process the UL IP packets and PDCP Control PDUs (shown as "PROCESSING TRANSMISSION POINT IDENTITY" field 1367).

Third message 1360 optionally includes an identifying information field (shown as "Point A identity" field 1369) for a Point A, i.e., a single transmission point to receive UL data transmissions from UE, as described previously.

First message 1300, second message 1330, and third message 1360 may be transmitted by a network entity, such as a stand-alone network entity, a CoMP controller, a primary transmission point, or a secondary transmission point to a recipient (such as a transmission point for first message 1300 and second message 1330, or a UE for third message 1360). Depending on arrangement of the fields in the messages, as well as modulation, coding, processing, and so on, of the messages, the fields in the messages may be transmitted in sequence, in parallel, or a combination of partly sequentially and partly in parallel.

Although the present invention and its advantages have been described in detail, it should be understood that various changes, substitutions and alterations can be made herein without departing from the spirit and scope of the invention as defined by the appended claims.

What is claimed is:

1. A method for transmission point operations, the method comprising:
configuring an identifier associated with a bearer served by a multiple point system comprising a primary transmission point and at least one secondary transmission point, wherein an intended recipient of an uplink (UL) data of the bearer is determinable based on the identifier;
transmitting downlink information of the bearer to a user equipment;
receiving, at a receiving transmission point, the uplink data of the bearer from the user equipment including an identification information related to the identifier,
determining, in accordance with the identifier, whether the intended recipient is located at the receiving transmission point or a first transmission point of the multiple point system; and
forwarding, by the receiving transmission point, the uplink data to the first transmission point upon determining the intended recipient of the uplink data is a corresponding packet data convergence control (PDCP) entity of the uplink data located at the first transmission point of the multiple point system, wherein the PDCP entity is assigned to the user equipment and the bearer.

2. The method of claim 1, wherein the identification information related to the identifier comprises a logical channel identifier.

3. The method of claim 1, wherein configuring the identifier comprises receiving the identifier.

4. The method of claim 1, wherein the uplink data comprises a plurality of groups of data, wherein each group of data includes a respective identification information related to a respective identifier, wherein the respective identifier indicates a respective intended recipient, and wherein forwarding the uplink data comprises forwarding each group of data to its intended recipient.

5. The method of claim 1, wherein the identification information related to the identifier comprises an information element to differentiate at least between radio link control (RLC) control packet data units (PDUs) and RLC data PDUs which carry PDCP PDUs to determine whether to forward the uplink data to the first transmission point.

6. The method of claim 5, wherein the information element is a field in an RLC PDU header indicating whether the RLC PDU is a RLC data PDU or an RLC control PDU.

7. The method of claim 1, wherein the identification information related to the identifier comprises a bearer identifier.

8. The method of claim 7, wherein the bearer is a radio bearer.

9. The method of claim 7, wherein the bearer is an enhanced packet system (EPS) bearer.

10. The method of claim 7, wherein the bearer is an Evolved Universal Terrestrial Radio Access Network (E-UTRAN) Radio Access Bearer (E-RAB).

11. A method of operating a user equipment, the method comprising:
receiving downlink data and control information of a bearer from one or more transmission points in a multiple point transmission system comprising a primary transmission point and at least one secondary transmission point;
generating a first identification information related to a first identifier according to the downlink control information;
including in an uplink (UL) data of the bearer the first identification information related to the first identifier, wherein the first identifier indicates whether an intended recipient of the UL data is located at a second transmission point in the multiple point transmission system or is a corresponding packet data convergence control (PDCP) entity of the uplink data located at a first transmission point in the multiple point transmission system, wherein the PDCP entity is assigned to the user equipment and the bearer; and
transmitting the uplink data to the second transmission point in the multiple point transmission system.

12. The method of claim 11, wherein the downlink control information includes an identifier associated with the second transmission point.

13. The method of claim 11, wherein the uplink data comprises a plurality of groups of data, wherein each group of data is labeled with a respective identification information related to a respective identifier, wherein the respective identifier is associated with a respective intended recipient of the group of data, and wherein transmitting the uplink data comprises transmitting the plurality of groups of data to the second transmission point.

14. The method of claim 11, wherein the first identification information related to the first identifier comprises a logical channel identifier.

15. The method of claim 11, wherein the first identification information related to the first identifier comprises an information element to differentiate at least between radio link control (RLC) control packet data units (PDUs) and RLC data PDUs which carry PDCP PDUs to determine whether to forward the uplink data to the second transmission point.

16. The method of claim 15, wherein the information element is a field in an RLC PDU header indicating whether the RLC PDU is a RLC data PDU or an RLC control PDU.

17. The method of claim 11, wherein the first identification information related to the first identifier comprises a bearer identifier.

18. The method of claim 17, wherein the bearer is a radio bearer.

19. The method of claim 17, wherein the bearer is an enhanced packet system (EPS) bearer.

20. The method of claim 17, wherein the bearer is an Evolved Universal Terrestrial Radio Access Network (E-UTRAN) Radio Access Bearer (E-RAB).

21. A receiving transmission point comprising:
a processor configured to configure an identifier associated with a bearer served by a multiple point system comprising a primary transmission point and at least one secondary transmission point, to determine, in accordance with the identifier, whether an intended recipient of an uplink (UL) data of the bearer is located at a first transmission point or the receiving transmission point of the multiple point system, wherein the intended recipient of the uplink data of the bearer is determinable based on the identifier, and to forward the uplink data to the first transmission point upon determining the intended recipient is a corresponding packet data convergence control (PDCP) entity of the uplink data located at the first transmission point of the multiple point system, wherein the PDCP entity is assigned to a user equipment and the bearer;
a transmitter coupled to the processor, the transmitter configured to transmit downlink information of the bearer to the user equipment; and
a receiver coupled to the processor, the receiver configured to receive the uplink data of the bearer from the user equipment including an identification information related to the identifier.

22. The transmission point of claim 21, wherein the uplink data comprises a plurality of groups of data, wherein each group of data includes a respective identification information related to a respective identifier, wherein the respective identifier indicates a respective intended recipient, and wherein the processor is configured to forward each group of data to its intended recipient.

23. The transmission point of claim 21, wherein the processor configured to configure the identifier comprises the processor configured to receive the identifier.

24. The transmission point of claim 21, wherein the identification information related to the identifier comprises a logical channel identifier.

25. The transmission point of claim 21, wherein the identification information related to the identifier comprises an information element to differentiate at least between radio link control (RLC) control packet data units (PDUs) and RLC data PDUs which carry PDCP PDUs to determine whether to forward the uplink data to the first transmission point.

26. The transmission point of claim 25, wherein the information element is a field in an RLC PDU header indicating whether the RLC PDU is a RLC data PDU or an RLC control PDU.

27. The transmission point of claim 21, wherein the identification information related to the identifier comprises a bearer identifier.

28. The transmission point of claim 27, wherein the bearer is a radio bearer.

29. The transmission point of claim 27, wherein the bearer is an enhanced packet system (EPS) bearer.

30. The transmission point of claim 27, wherein the bearer is an Evolved Universal Terrestrial Radio Access Network (E-UTRAN) Radio Access Bearer (E-RAB).

31. A user equipment comprising:
a receiver configured to receive downlink data and control information of a bearer from one or more transmission points in a multiple point transmission system comprising a primary transmission point and at least one secondary transmission point;
a processor coupled to the receiver, the processor configured to generate a first identification information related to a first identifier according to the downlink control information, and to include in an uplink (UL) data of the bearer the first identification information related to the first identifier, wherein the first identifier indicates whether an intended recipient of the UL data is located at a second transmission point in the multiple point transmission system or is a corresponding packet data convergence control (PDCP) entity of the uplink data located at a first transmission point in the multiple point transmission system, wherein the PDCP entity is assigned to the user equipment and the bearer; and a transmitter coupled to the processor, the transmitter configured to transmit the uplink data to the second transmission point in the multiple point transmission system.

32. The user equipment of claim 31, wherein the uplink data comprises a plurality of groups of data, wherein the processor is configured to label each group of data with a respective identification information related to a respective identifier, wherein the respective identifier is associated with a respective intended recipient of the group of data, and wherein the transmitter is configured to transmit the plurality of groups of data to the second transmission point.

33. The user equipment of claim 31, wherein the first identification information related to the first identifier comprises a logical channel identifier.

34. The user equipment of claim 31, wherein the first identification information related to the first identifier comprises an information element to differentiate at least between radio link control (RLC) control packet data units (PDUs) and RLC data PDUs which carry PDCP PDUs to determine whether to forward the uplink data to the second transmission point.

35. The user equipment of claim 34, wherein the information element is a field in an RLC PDU header indicating whether the RLC PDU is a RLC data PDU or an RLC control PDU.

36. The user equipment of claim 31, wherein the downlink control information includes an identifier associated with the second transmission point.

37. The user equipment of claim 31, wherein the first identification information related to the first identifier comprises a bearer identifier.

38. The user equipment of claim 37, wherein the bearer is a radio bearer.

39. The user equipment of claim 37, wherein the bearer is an enhanced packet system (EPS) bearer.

40. The user equipment of claim 37, wherein the bearer is an Evolved Universal Terrestrial Radio Access Network (E-UTRAN) Radio Access Bearer (E-RAB).

41. A method for transmitting a message, the method comprising:
   configuring an identifier associated with a bearer served by a multiple point transmission system, wherein an intended recipient of an uplink data of the bearer is determinable based on the identifier, and wherein the intended recipient is a corresponding packet data convergence control (PDCP) entity of the uplink data of the bearer from a user equipment located at a destination transmission point, wherein the PDCP entity is assigned to the user equipment and the bearer;
   transmitting, by a transmission point in the multiple point transmission system, a first field including the identifier associated with the bearer served by the multiple point transmission system; and
   transmitting, by the transmission point in the multiple point transmission system, a second field indicating the destination transmission point.

42. The method of claim 41, wherein there are a plurality of first fields with each first field comprising a respective identifier associated with a respective bearer served by the multiple point transmission system, wherein transmitting the first field comprises transmitting the plurality of first fields, wherein there are a plurality of second fields with each second field indicating a respective destination transmission point which receives the uplink data of the bearer, and wherein transmitting the second field comprises transmitting the plurality of second fields.

43. A method for transmitting a message, the method comprising:
   configuring an identifier associated with a bearer served by a multiple point transmission system, wherein an intended recipient of an uplink data of the bearer is determinable based on the identifier, and wherein the uplink data of the bearer from a user equipment is transmitted towards a receiving transmission point over air for forwarding by the receiving transmission point to the intended recipient, wherein the uplink data comprises at least one of radio link control (RLC) control packet data units (PDUs) and packet data convergence control (PDCP) PDUs;
   transmitting, by a transmission point in the multiple point transmission system, a first field including the identifier associated with the bearer served by the multiple point transmission system; and
   transmitting, by the transmission point in the multiple point transmission system, a second field including an indication of the receiving transmission point of the multiple point transmission system.

44. The method of claim 43, wherein there are a plurality of first fields with each first field comprising a respective identifier associated with a respective bearer served by the multiple point transmission system, wherein transmitting the first field comprises transmitting the plurality of first fields, wherein there are a plurality of second fields with each second field indicating a respective receiving transmission point of the multiple point transmission system, and wherein transmitting the second field comprises transmitting the plurality of second fields.

* * * * *